United States Patent [19]

Clark et al.

[11] 3,742,145

[45] June 26, 1973

[54] ASYNCHRONOUS TIME DIVISION MULTIPLEXER AND DEMULTIPLEXER

[75] Inventors: James M. Clark, Cedar Grove; Robert H. Haussmann, Wayne, both of N.J.

[73] Assignee: International Telephone and Telegraph Corporation, Nutley, N.J.

[22] Filed: Apr. 17, 1972

[21] Appl. No.: 244,753

[52] U.S. Cl. .......................... 179/15 BA, 179/15 AF
[51] Int. Cl. .............................................. H04j 3/04
[58] Field of Search .................... 179/15 BA, 15 BS, 179/15 BY, 15 AF

[56] References Cited

UNITED STATES PATENTS

| | | | |
|---|---|---|---|
| 3,480,734 | 11/1969 | Kuroyanagi | 179/15 BS |
| 3,541,524 | 11/1970 | Blasbalg | 179/15 AF |

*Primary Examiner*—Ralph D. Blakeslee
*Attorney*—C. Cornell Remsen, Jr., Menotti J. Lombardi, Jr. et al.

[57] ABSTRACT

There is described an asynchronous multiplexer and demultiplexer that operates on the basis of a stuff only technique. The multiplexer includes a different elastic store for each of the asynchronous input PCM data groups. Each of the elastic stores include a buffer register whose writing clock is synchronous with the asynchronous group input bit rate clock and a read clock which is synchronous with the bit rate of a synchronous data format employed for multiplexing the asynchronous group inputs. Each of the elastic stores produce a stuff request signal when the phase difference of the read and write clocks is equal to a given period, in numbers of bit periods. A common stuff control circuit samples the stuff requests and provides a control signal to inhibit the read clock to add or stuff a single stuff bit to the associated group data for each stuff request. Timing signals generated from a reference oscillator define the synchronous data format which includes 64 midframes within a superframe with each of the midframes including 15 subframes. Odd numbered ones of the subframes include 9 data bits and even numbered ones of the subframes include 8 data bits. The 9th data bit of the odd numbered subframes provide an overhead channel for transmitting digital voice orderwire, digital data orderwire, control words, a "zero" short sync bit, a "one" short sync bit and a long sync bit in each midframe. The bit assigned to the control words are employed to identify at the demultiplexer where the stuff bit has been added to the data format. The demultiplexer includes timing signal generators driven by the superframe rate receovered from the received data signal to provide the necessary timing signals to identify the supergroup frame, the midframe, the subframes and the data bits within the subframes. The timing signal generator in the demultiplexer is synchronized to the timing signal generators defining the data format in the multiplexer by a superframe recovery circuit responsive to both a short sync code and a pseudorandom long sync code. A common destuffing control is provided responsive to the code word identifying the presence or absence of a stuff bit to destuff the identified group data and thereby return the stuffed multiplexed group data to asynchronous group data as originally applied to the elastic stores of the multiplexer. The demultiplex includes for each asynchronous group data a different elastic store wherein the write clock is controlled by the recovered supergroup bit rate and the read clock is conjrolled at the group or midframe rate provided by the timing signal generators. The destuff control from the common destuff control circuit controls the write counter to cause destuffing of the associated one of the stuffed group data. A heterodyne type phase locked loop is employed in conjunction with each of the elastic stores to remove jitter from the destuffed group data.

22 Claims, 15 Drawing Figures

V = DIGITAL VOICE ORDERWIRE CHANNEL (HALF OF THESE BITS USED FOR 96-CHANNEL MODE)
D = DIGITAL DATA OR TELETYPE ORDERWIRE CHANNEL
C = CONTROL AND SIGNALING CHANNEL
SO = SHORT SYNC "O" BIT
S1 = SHORT SYNC "1" BIT
L = LONG SYNC CHANNEL
NOTE: S1 BIT IS SKIPPED EVERY 64th MIDFRAME (64th MIDFRAME HAS 127 BITS, NOT 128)

ASYNCHRONOUS TIME DIVISION MULTIPLEXER AND DEMULTIPLEXER

BACKGROUND OF THE INVENTION

This invention relates to a pulse code modulation (PCM) communication systems and more particularly to an asynchronous time division multiplexer and demultiplexer for employment in a PCM communication system.

To assist in the understanding of the description that follows the following terms employed therein are defined.

1. Elastic Store — A memory circuit with serial data input and output, capable of continuously variable delay from nearly zero up to several bit periods.
2. Control (used in the context of stuffing and overflow, and similar control circuits, control codes and control methods)— All operations relating directly to stuffing and/or overflow in the multiplexer and demultiplexer.
3. Stuffing — Adding bits (called stuff bits) to a data stream to adjust the bit rate.
4. Overflow — Removing bits (called overflow bits) from a data stream to adjust the bit rate. The overflow bits are sent in another channel called the overflow channel.
5. Destuffing — Removing stuff bits from a data stream to restore the original data and data rate. (see stuffing).
6. Jitter — Phase modulation of the timing of a data signal or an associated clock signal. Added jitter for a channel is the variation of delay of the channel.
7. Overhead Channel — The part of the supergroup signal which is not group data and not stuff bits.
8. Storage (Of an elastic store) — The present input-to-output delay of the elastic store, which, measured in bit periods, equals the average number of useful bits presently stored.
9. Capacity (Of an elastic store) — The maximum storage of an elastic store, minus the minimum storage (minimum generally nearly zero).

An asynchronous multiplexer is provided by adding elastic stores and control circuits to a synchronous multiplexer. The synchronous multiplexer provides a synchronous channel for each asynchronous input, as well as an overhead channel, which includes channels for various functions, such as synchronization, control and signalling, digital voice orderwire, and digital data or Teletype orderwire. More precisely, the synchronous channels are called synchronous because the data bits for each channel are transmitted at times which are fixed in a time frame which is continually repeated. Such a fixed allocation of bit times is called the "data format." It is not necessary that the bit times be exactly equally spaced for each channel. All that is required is that the receiver can synchronize to the sequence of data frames. The synchronous multiplexer combines four groups (48 PCM channels, maximum) in the 48-channel mode, generating a 2.4576 megabits per second (Mb/s) supergroup signal. In the 96-channel mode, eight groups (96 channels, maximum) are combined in a 4.9152 Mb/s supergroup signal. Six-channel groups 288 kilobits per second (Kb/s), dummy signals, and idle signals are also transmitted as 12-channel groups (576 Kb/s). The 48-channel 2.4576 Mb/s supergroup signal is transmitted as a 4.9152 Mb/s signal.

An elastic store and associated control circuit is used to adapt each asynchronous data input to its corresponding synchronous channel (input to the synchronous multiplexer). The elastic store permits a variable delay between the asynchronous data input and the input to the synchronous multiplexer, allowing the phases at these two points to be independent. In general, there also is a difference in bit rates at these two points, due to clock frequency errors. If the asynchronous input is slower than the synchronous channel, the control circuit must add "stuff" bits to the data stream, enough to prevent the elastic store from becoming empty of data bits. If, instead the asynchronous input is faster than the synchronous channel, the control circuit must remove "overflow" bits from the data stream, enough to prevent the elastic store from becoming too full, and must transmit these overflow bits in another channel. The actual design of an asynchronous multiplexer may use only stuff bits, or only overflow bits, or both, depending on the nominal source, channel rates and frequency errors.

In the receiver, a synchronous demultiplexer, elastic stores and control circuits operate to remove stuff bits, if any, and to reinsert overflow bits, if any, into their proper places in the bit streams. It is necessary that the transmit control circuits send suitable control information to the receive control circuits so that the receive control circuits will know when such adjustments are necessary. Frame synchronization is required to facilitate the demultiplexing of this control information as well as the demultiplexing of other data.

The operation of bit stuffing and/or overflow and multiplexing add jitter (phase modulation) to the data stream. The bit stuffing/overflow operation also responds to jitter at the data input. In the receiver, it is necessary to reduce this jitter for two reasons: (1) The equipment that receives data from the receive section of the demultiplexer, especially a group cable system, can tolerate only a limited amount of jitter, and (2) in a tandem string of multiplexers and demultiplexers the accumulation of jitter, measured in terms of worst-case peak-to-peak amplitude, may necessitate large amounts of elastic storage to preserve the bit integrity of the data. It is more economical to attenuate the jitter thereby reducing the per-channel elastic storage requirement. The jitter is attenuated by a clock smoothing circuit.

Asynchronous multiplexers are useful because they allow the combining (multiplexing) of a number of asynchronous data streams into one synchronous stream with the combined stream having all the advantages of synchronism. However, at the far end where the combined stream is broken down into its component streams these component streams (data groups) having substantial jitter. No matter what technique is employed to smooth out this jitter some residual effect remains either as phase discontinuities or as frequency variation which must cause some system degradation such as an increase in bit error rate.

In prior art multiplexers and demultiplexers there has been provided a stuff and/or overflow and a destuff and/or overflow insertion control arrangement for each of the different asynchronous data groups.

SUMMARY OF THE INVENTION

An object of this invention is to provide an asynchronous time division multiplexer and demultiplexer implementation that employs less components than the prior art implementations thereby resulting in reduced cost.

Still another object of the present invention is to provide an asynchronous time division multiplexer and demultiplexer employing a stuff only technique to adjust the bit rate of a plurality of asynchronous data groups so that they can be multiplexed into one synchronous data stream.

A further object of the present invention is to provide an asynchronous time division multiplexer having a stuff control circuit common to a plurality of asynchronous data streams or groups so that these asynchronous data streams may be multiplexed into one synchronous stream and an asynchronous time division demultiplexer having a single destuffing control circuit so as to properly destuff the synchronous stream to reproduce the plurality of asynchronous data streams.

A feature of the present invention is the provision of an asynchronous PCM multiplexer and demultiplexer combination to multiplex n asynchronous data groups having a first bit rate into a synchronous data stream having a predetermined fixed data format and a second bit rate greater than the first bit rate and to demultiplex the data groups from the synchronous data stream, where n is greater than one, comprising: n inputs, each of the inputs being provided for a different one of the data groups; n first means, each of the first means being coupled to a different one of the inputs, certain ones of the first means generating a stuff request signal upon achieving a predetermined phase difference between the first and second bit rates; second means coupled in common to each of the first means, the second means responding to the stuff requires signal from each of the first means to produce a stuff control signal for each of the certain ones of the first means to produce a stuff control signal for each of the certain ones of the first means and to multiplex unstuffed and stuffed data groups received from the first means according to the data format; each of the certain ones of the first means responding to an associated one of the stuff control signals to produce only a single stuff bit for each of the stuff request signal for addition to the associated one of the certain ones of the data groups at a given bit position within the data format to produce stuffed data groups for multiplexing with unstuffed data groups by the second means to provide the synchronous data stream; third means coupled to the second means to transmit the data stream along a given propagation medium; forth means coupled to the propagation medium to receive the data stream; fifth means coupled to the fourth means, the fifth means being synchronized to the data stream to produce a destuff control signal upon occurrence of each of the stuff bits; and n sixth means coupled to the fifth means, each of the sixth means responding to an associated one of the destuff control signal to delete the stuff bit from the certain ones of the data groups, each of the sixth means providing an associated one of the data groups at the output thereof.

Another feature of the present invention is the provision of an asynchronous PCM multiplexer to multiplex n asynchronous data groups having a first bit rate into a synchronous data stream having a predetermined fixed data format and a second bit rate greater than the first bit rate, where n is an integer greater than one, comprising: n inputs, each of the inputs being provided for a different one of the data groups; n first means, each of the first means being coupled to a different one of the inputs, certain ones of the first means generating a stuff request signal upon achieving a predetermined phase difference between the first and second bit rates; and second means coupled in common to each of the first means, the second means responding to the stuff request signal from each of the certain ones of the first means to produce a stuff control signal for each of the certain ones of the first means and to multiplex unstuffed and stuffed data groups received from the first means according to the data format; each of the certain ones of the first means responding to an associated one of the stuff control signals to produce only a single stuff bit for each of the stuff request signal for addition to the associated one of the certain ones of the data groups at a given bit position within the data format to produce stuffed data groups for multiplexing with unstuffed data groups by the second means to provide the synchronous data stream.

A further feature of the present invention is the provision of an asynchronous PCM demultiplexer to demultiplex a synchronous data stream having a predetermined fixed data format and a first bit rate into n asynchronous data groups having a second bit rate less than the first bit rate, the data groups being made synchronous with the data stream by adding only one stuff bit to certain ones of said data groups at different given bit positions within the data format, where n is an integer greater than one, comprising: an input for the data stream; first means coupled to the input, the first means being synchronized to the data stream to produce a destuff control signal upon occurrence of each of the stuff bits; and n second means coupled to the first means, each of the second means responding to an associated one of the destuff control signal to delete the stuff bit from the certain ones of the data groups, each of the second means providing an associated one of the synchronous data groups at the output thereof.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

A. General Principles of Invention (FIGS. 1, 2 and 3)

In order to obtain the objects of the present invention the control logic, coding and error correction for control of stuffing and/or overflow is simplified by using only stuffing to adapt each asynchronous input to a synchronous multiplexed channel. The logic costs are thus reduced, because control multiplexing of overflow bits is not necessary. This mode of operation is possible if the asynchronous input rate is always less than the synchronous channel rate, regardless of frequency errors. The relationship is obtained by slightly adjusting the data format. By dropping one bit per superframe from the overhead channel format, the nominal bit rate of the overhead channel is decreased, and the nominal bit rate of the synchronous group channels is increased to a rate 122 parts per million (ppm) higher than the nominal bit rate. Periodic decisions to stuff or not stuff are made by the multiplexer synchronously with the data format. The results of these decisions are coded, multiplexed and sent via the control channel to the demultiplexer. Two control codes are required to denote "stuff" and "no-stuff" messages. Two seven-bit codes, with a maximum Hamming distance, permit error correction capability to yield a bit integrity MTBF (mean time between failures) equal to 1103 days for a bit error probability equal to 0.001 percent.

Figures 1, 2, 3:
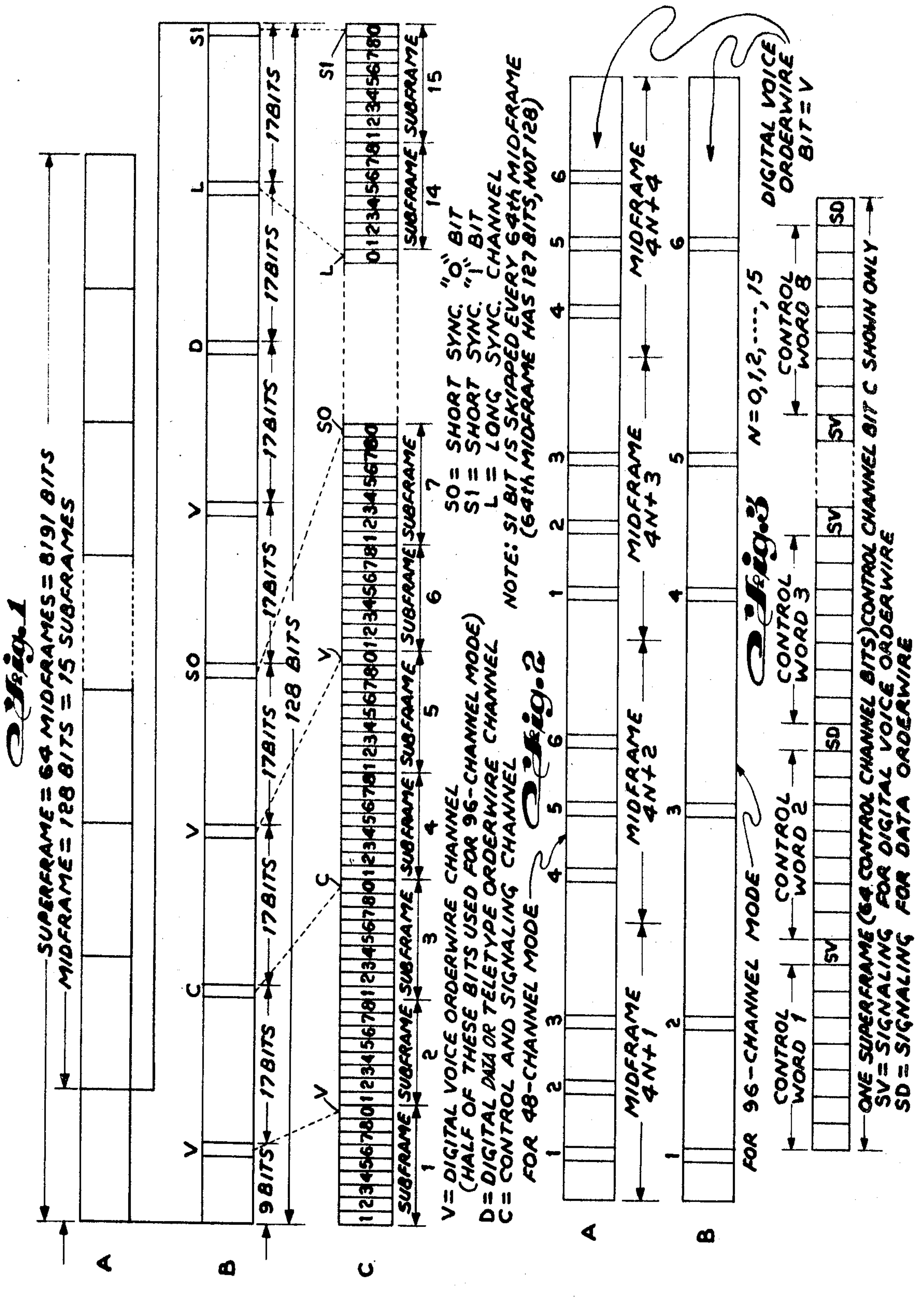
FIGS. 1, 2 and 3 illustrate the frame or format structure of the synchronous data stream in accordance with the principles of the present invention.

To multiplex the group channels and the overhead channel, a "midframe" of 15 "subframes" is constructed, as illustrated in Curves A, B and C of FIG. 1. The odd numbered subframes in each midframe have 9 bits, and the even numbered subframes have 8 bits as illustrated in Curve C, FIG. 1. The first eight bits of each subframe are assigned one bit at a time to the four or eight data groups. The ninth bit in the odd numbered subframes, if present, is assigned to the overhead channel. Thus, there are eight overhead bits per midframe. This part of the format is illustrated in Curve B, FIG. 1. This scheme provides nominally correct data rates with niminal format jitter, circuit costs and circuit complexity.

The format of the overhead channel is constructed by submultiplexing a control and signaling channel C, digital voice orderwire (DVOW) channel V, digital data orderwire (DDOW) channel D, "short sync" code S0 and S1, a "long sync" code L and (for 96-channel mode only) unused bits. This is illustrated in Curve B, FIG. 1. The two sync codes provide a more rapid synchronization of the lengthy data format than would be possible using only one sync code. Two overhead bits per midframe are used to transmit a 0,1 short sync code, which suffices to synchronize the midframe. The long sync, control, and DDOW channels are each assigned one overhead bit per midframe. This provides for each function 19,200 bits/seconds for the 48-channel mode and 38,400 bits/seconds for 96-channel mode. The DVOW channel is assigned 3 bits per midframe, but only half of these are used in the 96-channel mode as illustrated in Curves A and B, FIG. 2, thereby always obtaining 57.6 Kb/s. The long sync channel is used to transmit the long sync code. That is, a 64-bit pseudo-random code which defines a superframe of 64 midframes. This provides a basis for the submultiplexing of the control channel as illustrated in FIG. 3. In one superframe, eight words of eight bits each are transmitted in the control channel C. The first seven bits of each word is a control code used for communication between the transmit and receive control circuits of one group channel. The eighth bits of these words are used for signalling associated with the DVOW and DDOW channels.

The last short sync bit of each superframe is deleted, making the superframe 8191 bits long instead of 8192 bits long. This adjustment increases the nominal rate of each group channel by 122 ppm, making the "stuff-only" control method possible. The increase of frame synchronization time caused by this adjustment is slight.

The scheme of using two frame sync codes (called "short sync" and "long sync" herein) is used to obtain fast synchronization, with a minimum impact on format jitter, and little interference from the format adjustment. It has been estimated that the synchronization time will be 10 milliseconds (ms) or less synchronization time with no errors, more than 95 percent of the time and 15 ms or less with 0.1 percent bit errors, more than 95 percent of the time. The 95 percent limits allow these figures to be added directly to similar estimates of clock synchronization time for 95 percent limits also. The total figures will then be conservative for 90 percent limits. The totals thus obtained are 14 ms for no bit errors and 19 ms for 0.1 percent bit errors.

As mentioned previously there are two control mechanisms that can be used to adapt an asynchronous digital signal source to a synchronous digital channel or stream, namely, stuffing and overflow. If the source rate exceeds the channel rate, overflow bits are removed from the source dara group and transmitted on another channel (overflow channel). If the source rate is less than the channel rate, stuff bits are added to the data group. At the receiving or demultiplexer section, the stuff bits must be recognized and removed, and the overflow bits must be restored to their proper positions in the data group. Since the frequency errors of the source rate and channel rate cannot be predicted, the multiplexer must dynamically adjust to these errors and send sufficient information to the demultiplexer to enable it to make adjustments that agree with the transmit adjustments. The present invention multiplexer and demultiplexer uses stuffing only (no overflow bits), with a nominal stuff rate of 122 ppm of the group bit rate and uses seven-bit codes to send control information to the demultiplexer.

In general, the following information must be transmitted:

1. Type of control action, stuff, overflow, or no action;
2. Identity of channel being adjusted;
3. Number of stuff or overflow bits; and
4. Time of transmission of stuff or overflow bits relative to the data format and/or to the control message.

In addition to this control information, the overflow bits, if any, must be transmitted in a way that preserves the identity of the bits. That is, it allows them to be associated with appropriate control messages. The control logic and the coding of control messages can be simplified by restricing the above information without making it insufficient. The following paragraphs give some details of this concept.

When the nominal source rate and nominal channel rate are equal, both stuff and overflow techniques (at different times and places) must be employed to adapt the asynchronous source to the synchronous channel. If the nominal channel rate is made high enough, however, a stuff only technique can be employed and the nominal stuffing rate must be such a to exceed the sum of the worst source and channel bit rate errors. Also, if the nominal channel rate is low enough overflow only techniques can be employed and the overflow rate must exceed the sum of the worst case source and channel bit rate errors. Both the stuff-only and the overflow only methods are preferred because the control logic for one type of control mechanism is eliminated. The stuff-only and overflow-only methods also permit a minimum stuff or overflow rate to be maintained. This minimum rate can be designed to keep most of the jitter produced by the stuffing or overflow outside of the bandwidth of the clock smoother thereby substantially reducing elastic store requirements. Furthermore, the stuff-only technique is preferred to the overflow-only technique, because the removal, multiplexing, transmission, demultiplexing and reinsertion of overflow bits is eliminated thereby further reducing circuit costs and simplifying the overhead channel format. For these reasons, the asynchronous multiplexer and demultiplexer of this invention employs the stuff-only control technique. The stuff-only technique is made possible by adjusting the data format to provide a channel bit rate which is always larger than the source bit rate, regardless of frequency errors, provided the frequency errors are within prescribed limits.

There is no need to include a channel identity code in each control message if the control codes are multiplexed synchronously and if the data format includes frame synchronization coding sufficient to synchronize the control code multiplexing. The channel identity of each coded channel message is thus recognized from its position in the data format. The fixed control code rate required by the synchronous multiplexer also requires use of a "no-action" code. The code rate must be sufficient for the maximum stuffing rate.

There is no need to include a code for the number of stuff bits if this number is fixed in the logic design. One stuff bit per control message is preferred because this minimizes the stuffing jitter, or the variation of timing of the real group data in the supergroup signal due to the addition of stuff bits. If the available overhead bit rate were very restricted, it would be necessary to adjust more bits per control message to reduce the message rate, at the expense of requiring larger elastic stores. This is not the case of the present invention since there is allotted a generous amount of overhead bit rate compared to the functional requirements of the overhead channel.

There is also no need to include a time (address) code in the control message if the stuff timing is fixed relative to the data format and/or the control message. The stuff bit can be made to occur some fixed delay after the control message, or some fixed delay before and after the beginning of the next data frame following the control message. This restriction of adjustments to specific times causes additional stuffing jitter which is called "waiting" jitter.

The present invention uses all of the above simplifications of the control method, with the result that the information required in one control message is only the type of control action; stuff, or no action (don't stuff). This information can be represented by one bit (binary digit), but for more reliable transmission, redundant coding is required so that control messages can be accurately received even when a number of bits of the control code are in error. This avoids bit count integrity failures caused by erroneous reception of control codes. In the present invention the simplest code is employed, which requires two code words with a maximum Hamming distance. That is, the value of bit $n$ of word 1 is unequal to the value of bit n of word 2 (Example: 0111010 and 1000101). One word represents the stuff message and the other code word represents the don't-stuff message. As many as A bit error can be received per control word without a message error if the control code has $M = (2A = 1)$ bits. A majority vote procedure is employed to identify the message conveyed by a code having bit errors. For example, if four bits of a received seven-bit code agree with a perfect stuff code, and the other three bits agree with a perfect don't-stuff code, then it is decided that the message is stuff. Tie votes are avoided by choosing an odd number of bits per control code.

In general, a word error occurs only when there are more than A bit errors in one word of (2A+1) bits. If P is the bit error probability, the word error probability is approximately (for small P) equal to $P^{(A+1)}(1-P)^A(2A+1)!/(A!(A+1)!)$. The control word error rate, which partially depends on the control word rate, predominately determines the MTBF for bit integrity of each group channel. Calculations for the format illustrated shows that five bits per control word provides a MTBF of only 3.8 days which is too small. Using seven bits per control word, an MTBF of 1103 days is obtained. This is more than satisfactory.

The data format must include eight control words per frame or eight control subchannels for the eight groups multiplexed in the 96-channel mode. There are four groups in the 48-channel mode, and in the inventive multiplexer and demultiplexer disclosed herein, each active control circuit uses two control words per frame. Since the number of bits per frame is unchanged and the supergroup bit rate is halved, the control rate per group circuit is unchanged.

The standard rates for the supergroup signal (2.4576 Mb/s for 48-channel mode and 4.9152 Mb/s for 96-channel mode) require that the nominal total bit rate of the PCM groups must be 15/16 of the supergroup bit rate (8 × 576 Kb/s/4,915.2 Kb/s = 15/16), and the bit rate of all other data (called the overhead channel) must be 1/16 (approximately 6 percent) of the supergroup bit rate. If a multiplexing cycle of 16 bits is used, where 15 bits of each cycle are PCM bits, the correct rate is obtained but this cycle is not synchronous with the multiplexing cycle for four or eight groups, since 15 is not divisible by four. Also, there will be a format jitter. That is, the bits for each group will not be equally spaced in the format. It is possible to use a data format based on such cycles, since they have a common period of 128 supergroup bits, but the logic circuitry can be reduced if, instead, there is employed one multiplexing cycle with a varying period.

The bit rate of each group is 15/16×1/8 = 15/128 or 15/16×1/4 = 30/128 of the supergroup bit rate (depending on the 48/96-channel mode of operation). This indicates that in a frame of 128 bits, 15 or 30 bits (depending on the mode) should be allocated to each group. To minimize format jitter, and thereby the elastic storage size, the bits for each group should also be spaced as evenly as possible. This can be done by multiplexing the groups and the overhead channel in a subframe of eight or nine bits, where the subframe length alternates in a midframe of 15 subframes. The first eight bits of each subframe are used for the group data. The multiplexer either scans eight groups once or scans four groups twice in each subframe. The ninth bit, when used, is allocated to the overhead channel. The odd numbered subframes in each midframe have nine bits (there are eight such subframes), and the even numbered subframes have eight bits (there are seven of these per midframe). Thus, there are $(9\times8) + (8\times7) =$ 128 bits per midframe, including eight overhead bits and 15 or 30 bits per group. The logic circuitry is reduced, and the amount of format jitter is the same as for the multiplexing cycle of 16 bits mentioned earlier. The peak-to-peak phase modulation on each group channel is 7/64 of a bit period for 96-channel mode, and 9/32 for 48-channel mode. This modulation is periodic, having the same period as the midframe, and is synchronous with the midframe.

The overhead channel has a standard rate $75\times2^{11} =$ 153.6Kb/s for 48-channel mode, and $75\times2^{12} =$ 307.2Kb/s for 96-channel mode. Since there are eight overhead bits per midframe, the midframe timing can be used to divide the overhead channel into eight overhead subchannels of $75\times2^{8} =$ 19.2 Kb/s or $75\times2^{9} =$ 38.4 Kb/s, depending on the 48/96 channel mode. These subchannels can be used as a basis for allocating various fractions of the overhad bit rate to the various overhead functions, which are in accordance with this invention: (1) frame synchronization; (2) stuff control; (3) digital voice orderwire; (4) digital data or Teletype orderwire; and (5) signalling.

The control word rate must be fast enough to allow control of the worst-case frequency error. That is, to accommodate the maximum stuffing rate. In accordance with the present invention, the maximum stuff rate is 177 ppm of the nominal group rate; and minimum bit rate for the control channel is 5.7 Kb/s. The inventive multiplexer and demultiplexer uses a much highr bit rate for two reasons: (1) a higher control bit rate enables a shorter multiplexing cycle, and thus a shorter frame and more efficient frame synchronization; and (2) waiting jitter is reduced because it is inversely proportional to the control word rate.

The waiting jitter amplitude is especially important because it contributes most of the low frequency jitter components which are too slow for the clock smoother circuit to filter out. One overhead subchannel (38.4 Kb/s for the 96-channel mode) is a convenient rate for the data format and also satisfies the above considerations. A small bit rate is also needed for inband signalling associated with the voice orderwire and the data orderwire. A convenient way of fitting this requirement into the format is to add one signalling bit after each seven-bit control word. Since one control word per frame is required for each of the eight groups, this defines a frame containing 64 control channel bits. This also simplifies the logic design, because a binary counter (six divide-by-two circuits) used for the control multiplexing and word timing can also be used to divide the overhead subchannel rate by two. (The digital voice orderwire uses 3/2 of an overhead subchannel in 96-channel mode).

A six-bit PCM signal with a bit rate equal to or greater than 48 Kb/s has been chosen to transmit the voice orderwire. For 48-channel mode this channel can be more easily multiplexed into the 153.6 Kb/s overhead channel and the six-bit PCM word more easily synchronized, if the PCM channel bit rate is $(6\times153.6/M)$Kb/s, where M is an integer. For the bit rate to exceed 48Kb/s, M must be 20 or less. For the 96-channel mode, the overhead bit rate is $2\times153.6$ Kb/s, and M must be doubled. The multiplexing of eight control words, using the same counters, requires that M should be a multiple of eight. Thus, M=16 is chosen for 48-channel mode and M=32 for 96-channel mode. This gives a PCM rate of 57.6 Kb/s for both modes. The higher bit rate improves the PCM performance.

The digital data or Teletype orderwire channel must transmit asynchronous data at rates up to 1,200 bits/-sec. Bit stuffing and elastic storage is not required because up to $\pm10$ percent bias distortion is allowed, which implies that timing distortion is also allowed. (Timing distortion indicates the uncertainty of the time interval between two data transitions regardless of the direction of the transitions. Bias distortion is similar, but considers only two transitions in opposite directions.) The low data or Teletype rate and the relatively larger overhead channel rate implies that high channel efficiency is not necessary.

A circuit much less expensive than a bit stuffing and elastic storage scheme takes advantage of these relaxed requirements. This circuit simply retimes the data signal at a higher channel bit rate, sending several channel bits for each source bit. This method is inefficient (in terms of channel bit rate) and creates some timing distortion, but provides a satisfactory operation if the channel rate is sufficiently high, such as 19.2 Kb/s.

The following is a summary of the frame synchronization conditions that relate to the data format employed herein.

A single lumped sync format can be used for fast frame acquisition, but it interrupts the data stream for a substantial time, requiring a larger elastic store. A distributed sync format cannot be syncnronized quickly. However, by using two sync codes, the best features of both can be obtained. A short syn code such as a simple 0;1 distributed code can be synchronized quickly if the period (or frame) of the code is not too long. This can be used to synchronize a short part of the total superframe, such as the midframe. In the proposed data format, the short sync code occupies two overhead subchannels. Another sync code, called the "long" sync code, can occupy all or part of another overhead subchannel. The repetition period of the long sync code must be long enough to permit synchronization of the slowest multiplexing function, which is the multiplexing of eight control subchannels. After the short sync framing circuit has found the phase of the overhead subchannel containing the long sync code, the long sync framing circuit can synchronize quickly, because it does not have to examine all of the received data bits.

Two basic alternatives have been considered for the long sync code. One is a lumped sync code (typically six bits) occupying a small part of an overhead subchannel. The other is a pseudo-random sync code (typically 64 bits) which occupies an entire overhead subchannel. The logic costs of these two schemes are approximately equal. The pseudo-random code requies a greater bit rate, but permits faster synchronization. The pseudo-random code has been chosen for the present multiplexer and demultiplexer taking advantage of the generous amount of overhead bit rate which is available.

The slowest multiplexing cycle (control muliplexing) defines the longest data frame, which is called herein a "superframe." To permit complete synchronization, the long sync code must repeat once in the same frame. Since the control and signalling channel and the long sync channel are each one overhead subchannel, and the data format of the control and signalling channel has 64 bits per superframe, then the pseudo-random long sync code requires 64 bits. Pseudo-random codes are more economivally generated and detected when the code length is $2^N$ or $2^N-1$, where N is an integer. This is another reason for choosing a 64-bit control and signalling format.

The data format can be adjusted in a way that will change the nominal synchronous channel rate, and thus, the nominal stuffing rate. This adjustment is used in the inventive multiplexer and demultiplexer disclosed herein to eliminate the need for overflow for the reasons set forth hereinabove. It can also change the characteristics of jitter related to stuffing action, and thus change the performance of the clock smoothing circuits. The format disclosed herein is adjusted for 122 ppm nominal stuffing rate.

In prior art asynchronous multiplexers, where the exact supergroup bit rate was not specified, adjustment of the supergroup bit rate was used to adjust the nominal group channel rate. In the present inventive asynchronous multiplexer and demultiplexer, the supergroup bit rate is fixed, and the only way to adjust the nominal synchronous channel rate is to change the data format. Because the group and supergroup rates are both standard rates ($K\times75\times2^n$), a simple data format, as described hereinabove, leads to the equality of the nominal source rate and the nominal channel rate, thus requiring a stuff-and-overflow method of control.

However, the stuff-only method of control can be used if the nominal bit rate of the group channels is increased by at least 55 ppm, since the group source tolerance is ±45 ppm and since it is proposed to have a ±10 ppm tolerance for the supergroup rate. This increase is also the nominal stuff rate. If the nominal stuff rate is 55 ppm, the stuff rate can approach zero. The sawtooth jitter, which has the same frequency, and an amplitude of one cycle (peak-to-peak), can then also approach zero frequency and pass through any smoother without attenuation. By making an adjustment that provides a minimum stuff rate considerably greater than the bandwidth of the clock smoother, nearly all of the sawtooth jitter can be attenuated. A large stuff rate, however, increases the waiting jitter.

The supergroup bit rate, in accordance with our invention, must remain fixed so there must be provided a decrease in the overhead channel slightly to increase the group channel rate. The overhead bit rate is one-fifteenth of the total bit rate of all groups, so the overhead bit rate must be reduced by at least $15\times55 = 825$ ppm. The overhead bit rate can be decreased by dropping one overhead bit or more per superframe from the data format. This shortens the superframe slightly, and since the number of group channel bits per superframe is unchanged, the group channel rate is increased. The proposed data format as disclosed herein and illustrated in FIGS. 1, 2 and 3 drops one overhead bit per superframe, reducing the superframe from 8192 to 8191 bits, and increasing the nominal bit rate of each group channel by 122 ppm. This provides a minimum stuff rate equal to 67ppm of the group rate.

The format adjustment scheme, described hereinabove, raises two questions: (1) Where in the overhead channel format should the "dropped bit" be removed? and (2) How does such a discontinuity in the data format affect frame synchronization and other performance?

The consideration of these questions is included in the following discussion.

Format jitter is phase modulation of the timing of a given data channel as transmitted, due to irregular spacing between the bits of that channel in the data format. Some channels may have format jitter, and others not. Some format jitter is caused by the midframe format, and some from the stuffing rate adjustment scheme. In the following paragraphs there will be described a format jitter due to the midframe format alone (assuming no stuffing rate adjustment). Then, jitter due to the stuffing will be described. Next, the effect of format jitter on the performance of various functions will be considered.

Jitter amplitude of a data stream is defined as the peak-to-peak amplitude of the phase difference between the timing of the data stream and the timing of a hypothetical data stream having the same average bit rate but with no phase modulation (evenly spaced bits), using the bit period of the hypothetical data stream as the unit of amplitude.

For the midframe format discussed hereinabove, the even numbered subframes (group multiplex cycles) have eight bits and the odd numbered subframes have nine bits. Using the supergroup bit period as one unit of time, the spacing of the bits of one group (as transmitted, including stuff bits) for 96-channel mode is 9,8,9,8,9,8,9,8,9,8,9,8,9,8,9

This pattern is repeated, and since there is a 9 at either end of the pattern, there is always two adjacent 9's. For 48-channel mode, the pattern is 4,5,4,4,4,5,4,4, . . . 4,5,4,4,4,5.

Although other format arrangements are possible, such irregular bit timing is unavoidable because a particular group channel requires two bits (for 96-channel mode), or four bits (for 48-channel mode) per 16 group bits, but the overhead channel requires one bit per 15 group bits. The amplitude of the format jitter has been computed in units of average bit period and, is 7/64 for the 96-channel mode, and 9/32 for the 48-channel mode, peak-to-peak. The spacing of overhead bits has the pattern 9,17,17,17,17,17,17,17, as illustrated in Curve B, FIG. 1, which repeats each midframe. Since each overhead subchannel has one bit per midframe, a single overhead subchannel has no jitter from the midframe format (spacing is always 128 supergroup bits). A channel formed of more than one overhead subchannel will have jitter, for example, a channel having two bits per midframe may have a spacing pattern of 60,68.

When the stuffing rate is adjusted by allocating one less bit per superframe to an overhead subchannel, additional format jitter results. One special overhead subchannel will have 63 bits per superframe, and the other seven overhead subchannels will have 64 bits per superframe each. The bit spacing of the special overhead subchannel will be 255, 128, 128, 128, . . . , 128, 128

The bit spacing for the other overhead channels will be 127, 128, 128, 128, . . . , 128, 128.

The jitter amplitude in the first case is nearly one bit, while in the second case the amplitude jitter is approximately one one-hundred twenty-eight of a bit period. The stuff rate adjustment also adds jitter to the group channels; approximately 0.234 peak-to peak for 48-channel operation, and approximately 0.117 for 96-channel operation.

Format jitter on the group channels contributes to the requirement for elastic store capacity.

Format jitter on the digital data orderwire is too small to affect the timing distortion appreciably. The margin between the distortion and the worst-case distortion due to asynchronous retiming is more than sufficient to include the effect of format jitter.

The control and signalling operations are synchronized to the data format in the multiplexer and demultiplexer in an identical manner, and are thus unaffected by the format jitter.

The digital voice orderwire circuitry is similarly unaffected as long as the circuits are worst-case for the shortest possible spacing. In fact, the format jitter helps the circuit design, because the bit spacing can be arranged to be greatest where it is most needed (between PCM words). Because the PCM coder and decoder operate synchronously, the phase modulation does not appear on the recovered audio signal. The 9.6 KHz (kilohertz) of the audio waveform has some phase modulation, but the instantaneous sampling frequency is always faster than necessary.

Jitter due to midframe format does not affect frame synchronization performance. However, format jitter due to the stuffing rate adjustment does disturb the frame synchronization, but only the short sync framing circuit during frame sync acquisition. This occurs because the data format adjustment creates a one-bit shift of the phase of the short sync code once per superframe. When in sync, the timing logic can account for this shift and remain undisturbed. When out of sync, the phase shifts of the transmit (received) timing and the receiver internal timing occurs at different times. It helps some to inhibit the phase shifts of the internal timing when out of sync. Nevertheless, when the short syc framing circuit, seaching for correct frame phase, happens to reach the correct phase shortly before a phase shift of the received short sync code, the circuit will not lock onto the correct phase. Although this does not always happen, the possibility of this happening increases the average frame synchronization time.

The data format of the inventive multiplexer and demultiplexer is based on subframes within midframes within a superframe. The subframes provide timing to multiplex and demultiplex the group channels and the overhead channels. The midframe timing is used to modify the subframe timing to obtain the required overhead bit rate, and also to multiplex several overhead subchannels into the overhead channel. The superframe format provides timing for submultiplexing one of the overhead subchannels, namely, the control channel. This format also defines the long sync code timing and the timing of the digital voice orderwire channel. One midframe in each superframe is shortened to adjust the nominal stuffing rate. The normal midframe format is illustrated in Curve C, FIG. 1. There are 15 subframes in every midframe. The odd-numbered subframes comprises nine bits, and the even-numbered subframes eight bits as illustrated. Each bit in a subframe is allocated to a channel as illustrated. In 96-channel mode, channel $n$ is assigned to group $n$ ($n = 1, 2, 3, \ldots, 8$). In 48-channel mode, channels $n$ and ($n+4$) are assigned to group n ($n = 1, 2, 3, 4$). The channel O of the odd-numbered subframes is the overhead channel. The overhead bits appear only at the end of the odd-numbered subframes. Thus, there are eight overhead bits in a 128-bit midframe, spaced as shown in Curve B, FIG. 1. In one place, two odd-numbered subframes are adjacent (subframe 15 of one midframe and subframe 1 of the next midframe), and, therefore, successive overhead bits are spaced nine bits apart instead of 17, as elsewhere. The midframe format assigns overhead bits to the digital voice orderwire, digital data orderwire control, short sync and long sync channels as shown in Curve B, FIG. 1.

The short sync code 0,1 is entirely contained in one midframe, and thus provided for synchronization of the midframe format. A 0 short sync bit is sent 60-bit periods after a 1 short sync bit, and a 1 short sync bit is set 68-bit periods after the 0 short sync bit.

The digital voice orderwire channel transmits six-bit PCM codes. Since only three bits per midframe are assigned to the digital voice orderwire channel, the midframe format alone cannot synchronize the PCM codes.

There are 64 midframes in each superframe. The last midframe in each superframe is shortened to 127 bits by omitting the last bit, which otherwise would be a short sync 1 bit. The omission of this bit increases in bit rate of the group channels by 122 ppm as follows. Before adjustment, there are $128 \times 64 = 8192$ bits in a superframe. The number of overhead bits in a superframe is $8 \times 64 = 512$. The remaining $8192 - 512 = 7680$ bits are group channel bits, including all groups and including stuff bits (if any). The total bit rate for all groups after stuffing is thus $7680/81 \times 92 = 15/16$ of the supergroup rate, exactly. Thus, if the supergroup rate is exactly 2,4576 (or 4.9152) Mb/s, the group rate after stuffing will be exactly 576 Kb/s. After the adjustment, there are $8192 - 1 = 8191$ bits in a superframe, and $512 - 1 = 511$ of these are overhead bits, and 7680 group bits, as before. The ratio $8192/8191 = \mathbf{1.000122}$, so that the rate of all groups is increased 122 ppm. With a group rate error of ±45 ppm and a supergroup rate error of ±30ppm, the stuffing rate required will vary from 47ppm to 197ppm, and no overflow will be required. By holding the supergroup rate error to within ±10ppm, the stuffing rate is held to a smaller range, namely, 67ppm to 177ppm.

The six-bit code of the voice orderwire channel is synchronized to a period of two or four midframes, as shown in Curves A and B of FIG. 2. One of these periods (for N = 0) starts at the beginning of a superframe. For 48-channel mode, there is one six-bit code for two midframes. For 96-channel mode, only the odd-numbered bits allocated for digital voice orderwire are used, and there is one six-bit code for four midframes. In both cases, there is a little more time than the average bit period between the sixth bit of one code and the first bit of the next code.

There are 64 long sync bits in one superframe. These comprise one long sync code, which is:

0000001000011000101001111010001110010010 11-
0111011001101010111111

There are 64 control channel bits in one superframe. These are arranged as eight seven-bit control words and eight signalling bits, as illustrated in FIG. 3. For 96-channel mode, control word n is associated with group *n*. For 48-channel mode, control words *n* and (*n*+4) are associated with group *n*. The control words for group *n* comprise control subchannel *n*. The signalling bits are alternately allocated to the digital voice orderwire signalling channel and the digital data orderwire signalling channel.

The control words are 1111111 for a "stuff" message and 0000000 for a "don't stuff" message. The signalling code for both orderwires is 1 for "ring" and 0 for "idle".

Figure 4:
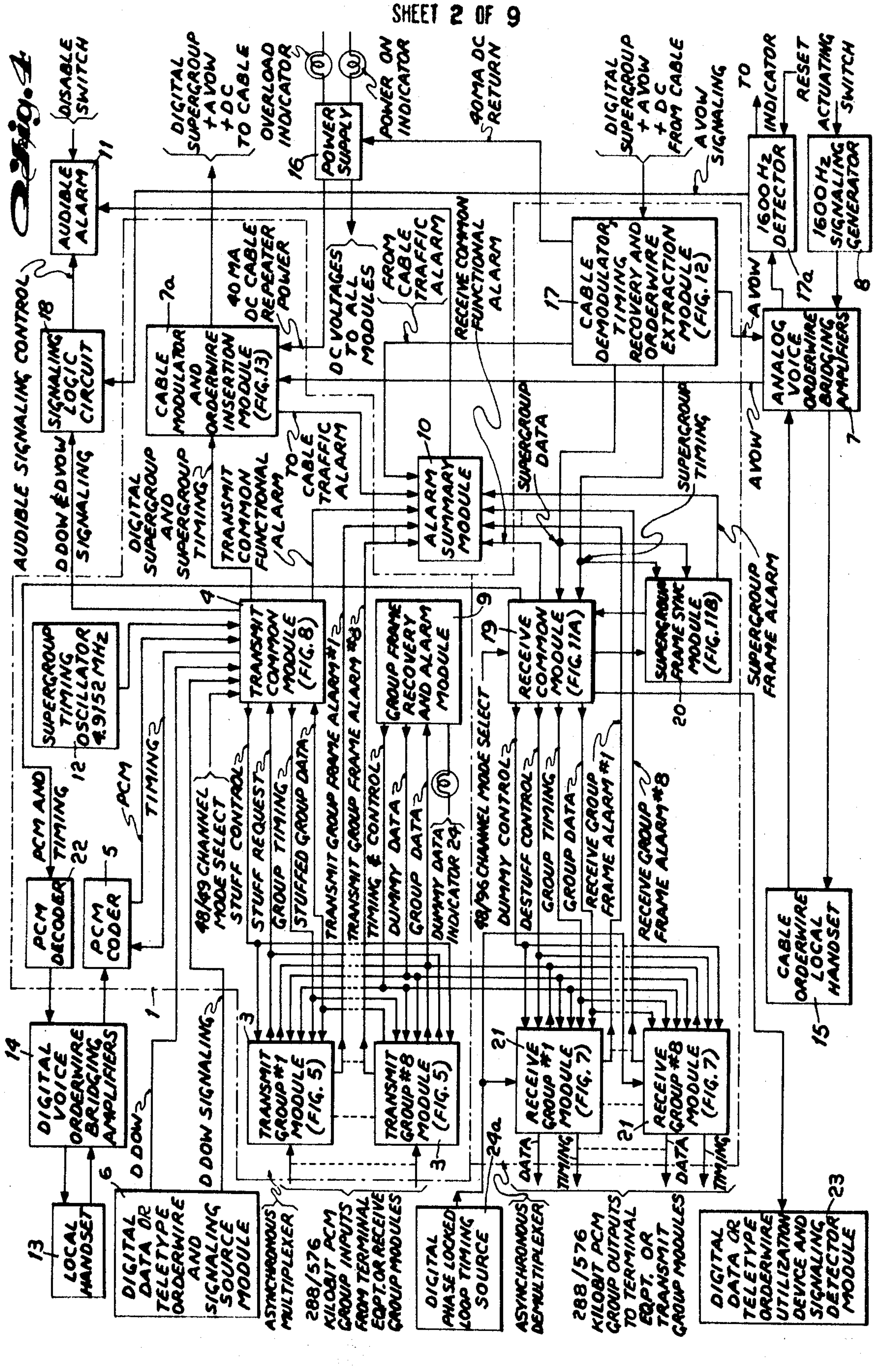
FIG. 4 is a functional block diagram of the asynchronous time division multiplexer and demultiplexer in accordance with the principles of the present invention.

B. Overall Multiplexer and Demultiplexer Combination (FIG. 4) communication system. an Referring to FIG. 4, there is illustrated therein an asynchronous multiplexer 1 and an asynchronous demultiplexer 2. Each of the multiplexer 1 and demultiplexer 2 have predetermined inputs and predetermined outputs as will be discussed hereinbelow. The illustration of FIG. 4 is capable of several station configurations depending upon its purpose in a PCM communication system. If the asynchronous groups coupled to multiplexer 1 are from asynchronous group sources and the asynchronous group outputs of demultiplexer 2 are to utilization device, the configuration of FIG. 4 is a terminal station for a two way PCM communication system. On the other hand, if the asynchronous PCM group inputs into multiplexer 1 are received from the output of demultiplexer 2, there is then present in FIG. 4 an illustration of a one way repeater terminal which can be made two way by duplicating the equipment of FIG. 4 with the connection from the output of demultiplexer 2 to the input of multiplexer 1 being in the opposite direction so as to provide a two way repeater terminal.

In addition, it will be noted that the multiplexer 1 and demultiplexer 2 are associated with cable transmission or propagation mediums. This is only for purpose of illustration and could just as well be organized so as to have the multiplexer 1 and demultiplexer 2 associated with radio propagation mediums.

Multiplexer 1, or the transmit section, accepts up to eight 6/12 channel PCM groups — 288/576 Kb/s) in the 96-channel mode, and up to four such PCM groups in the 48-channel mode. Each group input goes to one of the eight transmit group modules 3 each of which performs the required level interface to transistor transistor logic circuitry, recovers the timing associated with the data group and stores the data in a four-bit buffer. The data is read out of the buffers with group timing signals generated by the transmit common module 4. A common stuff control contained in module 4 periodically samples the state of each group module buffer to determine when it is required to stuff the group data stream. The stuffed, synchronous data outputs are wired — AND to provide a multiplexed data stream into common module 4. The multiplexing of the remaining signals including framing or sync bits, control bits, digital voice orderwire from decoder 5, digital data orderwire from module 6 and PCM anddata signalling from module 6 are accomplished within module 4. The composite digital supergroup, (4.9152 Mb/s for both 96- or 48-channels) goes to a cable modulator and orderwire insertion module 7*a* where DC (direct current) repeater power from power supply 16 (if required) is added along with the analog voice orderwire from analog voice orderwire bridging amplifiers 7. The resultant combined signals are then transmitted over up to 5 miles of cable. A signalling generator 8 is coupled to amplifiers 7 and, hence to module 7*a* to provide an indication when analog voice orderwire is present in the composite signal transmitted on the cable. wired-AND The group frame recovery and alarm module 9 is a time-shared logic module which checks each group data input and also the receive the group data outputs sequentially, determines if there is an acceptable frame synchronization pattern detectable and activates a group frame alarm if no pattern is detected. A wired-AND configuration is used to connect the group signals to module 9, under control of decoding logic on the group modules and group select signals which are generated in module 9. Module 9 provides signals which also sets or resets the per-group alarm flip flops which activate lamp drivers for local and remote indicators. The group alarms are also summarized by the alarm summary module 10 to activate front panel visual indicators. Alarm summary module 10 also activates an audible alarm 11 located on the front panel.

A fixed oscillator 12 provides the basic 4.9152 Mb/s square wave clock for module 4. In 48-channel operation the output of oscillator 12 is divided by two.

The timing module is contained in module 4.

A functional alarm from module 4 and a traffic alarm from module 6 go to alarm summary module 10. Alarm drivers are activated to operate local panel and remote alarms, with the functional alarm inhibiting the traffic alarm. An audible alarm is activated when any visual alarm is activated.

PCM coder 5 receives a voice signal from the operator's console or local handset 13 through amplifiers 14. Coder 5 under control of timing signals from module 4 generates a six-bit PCM code. Digital data orderwire and digital data orderwire signalling from module 6 go directly to module 4.

The analog voice orderwire is received from handset 15, coupled to amplifier 7 and, hence, to module 7*a*.

Power supply 16 provides the required DC voltages for the various modules of both the multiplexer 1 and demultiplexer 2 plus a DC current supply for repeaters when used in a cable transmission system. The constant current power supply 16 provides the single end power feed to the cable system repeaters when the other end of the cable is terminated with a system as illustrated in FIG. 4.

Demultiplexer 2, or the receive section, performs the inverse function of multiplexer 1. A cable composite signal containing digital supergroup, analog voice orderwire and repeater DC power (when required) is separated into its components in cable demoulator, timing recovery and orderwire extraction module 17. The DC power is returned to power supply 16. The analog voice orderwire signal is coupled to amplifiers 7 and, hence, to handset 15. Also the signalling signal for the analog voice orderwire is coupled to detector 17*a* and, hence, to the signalling logic circuit 18 which controls audible alarm 11. It should be mentioned at this time that signalling logic circuit 18 also receives from module 4 the digital data orderwire and digital voice orderwire signalling signal for proecessing to actuate audible alarm 11.

The digital supergroup in module 17 is amplified, shaped to transistor transistor logic levels and retimed by clock recovery circuits contained in module 17. The digital supergroup and its timing is then coupled to receive common module 19 and also the supergroup frame recovery module 20. When framing is verified in module 20, module 19 can send the correct timing signals and destuff controls to the eight receive group modules 21 to demultiplex 576 Kb/s asynchronous PCM groups. Module 19 also supplies digital voice orderwire and digital voice orderwire timing signal for coupling to PCM decoder 22 which decodes the signals and sends the buffered audio signal to the operator's console or local handset 13. Module 19 also demultiplexes the digital data orderwire and digital data orderwire signalling and couples these signals to a digital data or Teletype orderwire utilization device and signalling detector module 23.

Module 9 looks at the received group data for a frame sync or dummy pattern and activates the group alarms when framing is not verified. If the supergroup frame is not verified, the receive group frame alarms from modules 21 are inhibited. An indication is given by indicator 24, if any, when the receive group modules 21 are processing a dummy pattern.

Group modules 21 must smooth the destuffed data which is jittery due to the "holes" produced by the destuffing process. Each of group modules 21 are coupled to a digital phase lock loop timing source 24*a* which receives internal timing signals from a common timing source. The two output signals from each of the modules 21 may be single-ended data and timing or balanced two-wire data for connection to utilization device in a terminal station or to modules 3 of the multiplexer 1 in a repeater terminal.

Figure 5:
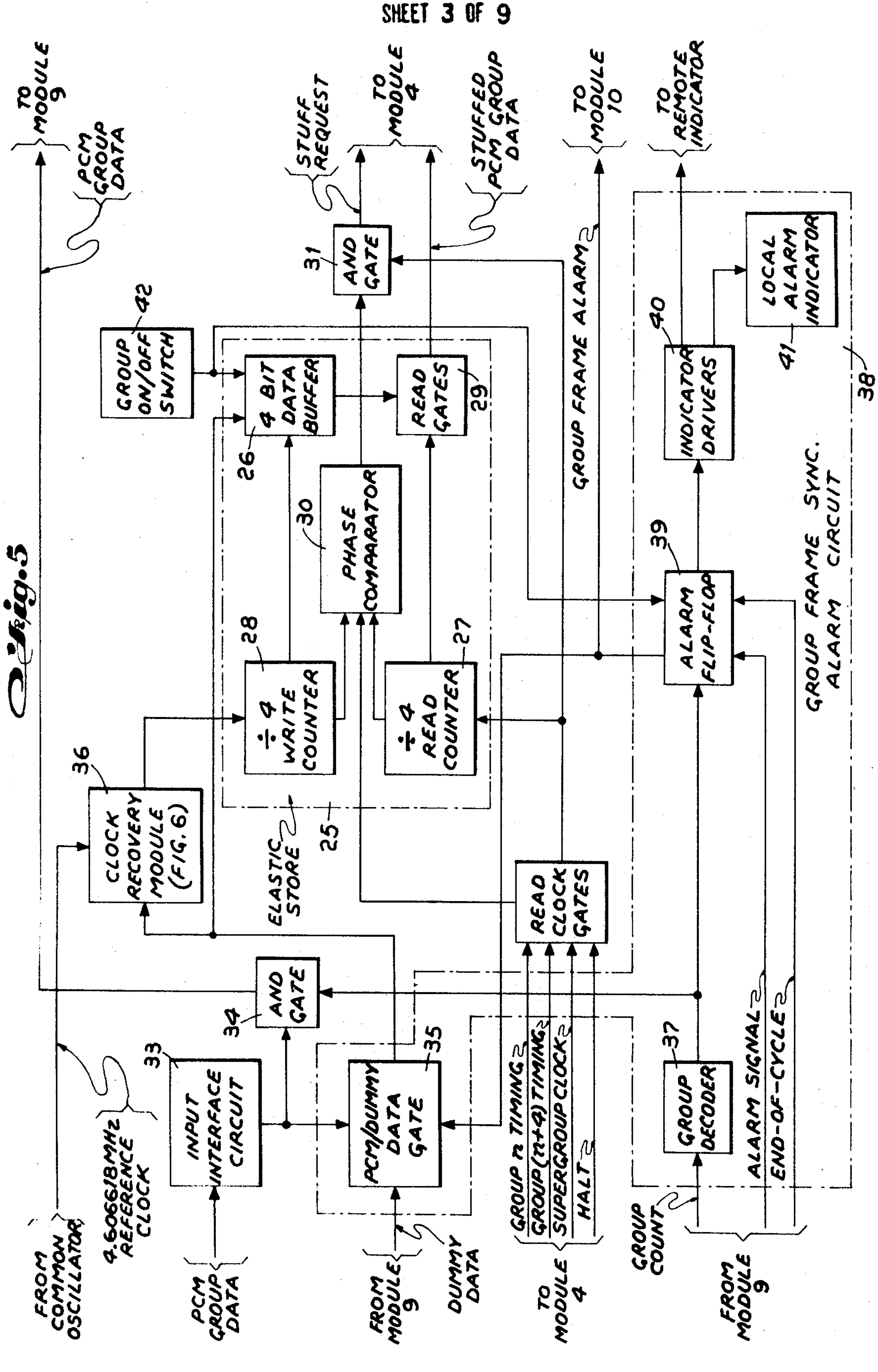
FIG. 5 is a block diagram of a transmit group module of FIG. 4.

C. Transmit Group Module (FIG. 5)

A group module3 or 21 contains all functions required for processing one input group (module 3) and its associated output group (module 21), with the exception of functions which are common to one or more groups. These functions are contained in common modules 4 and 19.

The basic function of the group module is to act as an elastic store, or buffer, to accommodate the frequency difference between an asynchronous group input/output rate and the synchronous group channel contained within the supergroup bit stream. The elastic store with its input/output phase comparator acts as a rate comparison buffer and generates the information required by modules 4 to perform the bit stuffing at a rate which compensates for the frequency difference between the synchronous and asynchronous rates. The output group timing in module 21 must be smoothed to remove the jitter from the destuffing process.

The group modules 3 and 21 also contains the per-group functions which form part of the group frame synchronization alarm circuits. The common functions are located on a separate module. The frame alarm storage flip flops and local indicators are also located on the group module, one each for the input and output groups.

The design of the group modules disclosed herein represents the simplest, most efficient hardware approach which will fulfill all the requirements of group modules 3 and 21 and the associated common modules 4 and 19.

It has been determined that at least a three-bit elastic store is required in the elastic store. Since the read and write counters each need two flip flops for either three or four state counting, a four bit elastic store has been provided. The small additional cost of one-half flip flop package and a gate in the readout logic provides the extra margin of one additional bit of elastic storage.

Referring to FIG. 5, there is disclosed therein a block diagram of one of modules 3. The elastic store 25 is a four-bit data storage register provided by buffer 26 with separate read and write clocks independently controlled by divide-by-four read and write counters 27 and 28, respectively. The read and write counters 27 and 28 steer the data from serial input directly to the storage locations in buffer 26 and from storage directly to the serial output from read gates 29. The organization allows the read and write counters 27 and 28 to circulate through storage bits one to four and back to one again at different rates. Since the stored data is not shifted or circulated, the write (input) and read (output) functions are non-interfering.

It should be noted that a steered entry and readout is the simplest form of buffer 26 around which an elastic store may be built. A simple shift register would not work at all since its input and output are identical. If the serial register is modified to allow for the difference in input and output rates, for instance, by changing either the input or output to a parallel connection, the control logic becomes quite complex compared to a steered input/steered output register.

Read counter 27 is nominally faster than write counter 28 and, therefore, will tend to "catch-up and pass" write counter 28 as they cycle. The digital phase comparator 30 detects when read counter 27 is within two bits of catching up to write counter 28 and generates the stuff request in AND gate 31 for coupling to the stuff control logic of module 4. The stuff control signal identified as HALT deletes a clock pulse from the read timing, thereby halting counter 27 and causing the same bit to be read out of the elastic store twice in succession. This redundant bit is the "stuff" bit. Meanwhile, write counter 28 continues at its uninterrupted rate and gets further ahead of read counter 27 in buffer 26. Phase comparator 30 is simply one gate and a latch which is set when read counter 27 is two bits or less behind write counter 28, and reset when the stuff bit is generated.

Edge-triggered D-type flip flops are used in buffer 26. Write counter 28, then, can simply be a two-bit Johnson counter with the flip flop outputs triggering the buffer flip flop with no additional gating required. The two-bit counter 27, thus, must have decoding gates to select the one-of-four outputs into the output data bus. Using a "wired-AND" bus connection for the eight input groups reduces the number of wiring connections at the module 4 by seven. A similar bus arrangement is used to clock the eight group stuff request signals onto a common bus.

Read clock gates 32 decodes the group timing from module 4 and retimes this with the 4.9152 Mb/s supergroup clock. The group timing decoding is accomplished in group decoder 37 by AND'ing two signals out of six generated by the counters in module 4. The correct two signals for each of modules 3 are wired into the module connector, and the group modules are therefore identical and interchangeable. In addition to the group timing, those modules in group positions one through four also have the group ($n$+4) timing wiring to the connectors. These signals are enabled by module 4 when the equipment is in the 48-channel mode operation. The data bit positions in the supergroup format assigned to groups 5 through 8 in the 96-channel mode are therefor used by groups one to four, respectively, in the 48-channel mode. The outputs from gates 32 control counter 27, comparator 30 and AND gate 31. The PCM group input signal are coupled to input interface circuit 33 for level adjustment to be compatible with the remainder of the equipment. The output signal of interface circuit 33 is coupled to AND gate 34 and PCM/dummy data gate 35.

A dummy data or PCM group output of gate 35 is coupled to clock recovery module 36 whose output controls the operation of write counter 28. The output of gate 35 is coupled to buffer 26. The output of AND gate 35 under control of group decoder 37 provides the PCM group data or dummy data to module 9.

The per-group functions of the time-shared group frame synchronization logic are contained in the group module the components of which are included in dotted block 38. Group sync alarm circuit 38 includes group decoder 37, gate 35, alarm flip flop 39, indicator driver 40 and local alarm indicator 41. The group decoder receives four out of eight signals from the module 9. These four signals are wired into the connector to correspond to the group number. The output of the group decoder 37 enables the alarm signal and end-of-cycle signals to set or reset flip flop 39 on the module selected by the group count. The group count also gates the data out of interface circuit 33 through AND gate 34 and, hence, to module 9. The output of gate 34 saves 15 inputs to module 9.

When the component of module 9 fail to detect normal PCM frame pattern or dummy signal, alarm flip flop 39 will be set by the alarm signal and end-of-cycle signal. Conversely, if a good traffic signal is subsequently detected, the alarm flip flop will become reset at the end of that cycle. Flip flop 39 controls gate 35 and indicator drivers 40 and also sends an alam signal to module 10 (FIG. 4). During an alarm condition gate 35 substitutes the dummy data from module 9 (FIG. 4) for the output of interface circuit 33 at the input to clock recovery module 36 and buffer 26. Also during an alarm condition indicator drivers 40 activate a local lamp on the module and a remote indicator at a remote alarm display module if connected.

The group on/off switch 42 is located on the group module. When switch 42 is in the off position, the flip flops of the four-bit buffer 26 are forced to alternate "one" and "zero" (set and reset) to produce a fixed data pattern different than the dummy pattern. This performs the function of an activity flip flop. Also switch 42, when in its off position, holds flip flop 39 in the reset condition (no alarm).

The stores of each group signal passes through an elastic store before being multiplexed and transmitted, and also after being received and demultiplexed. The transmit and receive elastic stores are similar in design, although there are small but important differences. For clarity, the transmit elastic store will be discussed first. Many of the statements appearing herein will apply to both elastic stores. Differeing considerations for the receive elastic store will be discussed later.

Elastic store 25 is a digital buffer memory having the following properties:

1. The timing of the data input, given by a write clock, and the timing of the data output, given by a read clock, are completely independent. That is, no specific frequency or phase relation is required for proper operation. 2. Input and output data are in serial format and bits appear at the output in the same sequence as they were entered.

3. As described hereinabove, elastic store 25 includes read and write counters 27 and 28 which are operated by the respective clocks, and which successively address each storage location in buffer 26. Read and write timing will be used to refer to the phase of these counters, as well as to the phase of the read and write clocks.

From these properties it follows that the average delay through the elastic store divided by the average bit period, equals the average number of bits occupying the elastic store at one time. Also, the storage (number of bits in the elastic store) will instantaneously follow any variations in the phase difference of the read and write clocks. Thus, any phase lead of the write clock or phase lag of the read clock increases the storage, except that any such attempt to increase the storage when the elastic store is full will create a bit integrity error (overflow, or lost bit). Likewise, any phase lag of the write clock or phase lead of the read clock decreases the storage, except that any such attempt to decrease the storage when the elastic store is empty will create a bit integrity error (underflow, or extra bit). However, such bit integrity errors are avoided in elastic store 25 by examining the present amount of storage and then choosing a control action (stuff, or do nothing) which tends to avoid the too full and too empty conditions.

For the stuff-only control method of the present invention, a stuff decision is made at elastic store 25 when the storage falls below some threshold, and a don't-stuff decision is made when the storage exceeds the threshold. When a stuff decision is made, one read clock pulse is inhibited, retarding the read timing by one bit period, and a stuff bit is transmitted in the bit period corresponding to the inhibited clock pulse. The stuff decision thus increases the storage of the elastic store by one bit. On the other hand, since the read clock is faster than the write clock, the elastic store tends to empty if no stuff decisions are made.

Bit integrity errors are avoided if the storage, although varying, never goes beyond the limits of zero (empty condition) and the capacity of the elastic store (maximum storage, or full condition). This can be accomplished if the elastic store is designed with a sufficient capacity and if the stuff decision threshold is properly set between the above mentioned limits. A worst-case design for the elastic store with respect to its capacity and threshold is proposed herein. These parameters are determined by the following considerations of the phase comparator and analysis of the jitter and storage:

There are two types of phase comparators that can be used to make the stuff/don't-stuff decision. (1) Only one decision can be made for each control word period, so the phase comparator may make a decision depending on the phase difference at one particular time during each control word period. The decision may depend on the most positive (or the most negative) phase difference occurring during the past control word period. The first type, when sampling fast asynchronous jitter, will convert the fast jitter to slower jitter with the same peak amplitude. The slower jitter is less easily attenuated by the smoother circuit. (2) The second type, which is what is employed herein, tends to follow the envelope of fast jitter and will thus attenuate fast asynchronous jitter Jitter which is synchronous to the control word cycle (such as format jitter), produces a constant (DC) response.

The stuffing depends on the phase difference of the write and read timing and, therefore, reacts to the input jitter of the write timing and output jitter of the read timing.

Going into transmit elastic store 25 jitter. source jitter from the source of the group data input and clock recovery jitter which is added by the circuit which recovers a clock from the input data signal. Coming out of elastic store 25 is group format jitter, which is transmitted via the group channel, and stuffing jitter, which is transmitted via the corresponding control subchannel. The source jitter is determined by the clock smoother and tandeming considerations.

There are several components of stuffing jitter. These are best understood and analyzed by first considering an unrealistic, simplified elastic store and adding the real complications one at a time.

If there were no source jitter, and the control logic could generate a stuff immediately when the storage goes below the threshold, the stuff bits would be equally spaced. Since a phase jump of one bit period is caused by each stuff bit, the stuffing jitter would be a sawtooth wave with a peak-to-peak magnitude equal to one bit period, and with a frequency equal to the stuff bit rate (the difference between the asynchronous and synchronous group rates). This is called "sawtooth" jitter and is really only part of the stuffing jitter.

As discussed hereinabove the stuff bits are made synchronous to the data format. Thus, when the threshold condition demands a stuff bit, the control logic must wait until some predetermined time in the superframe to generate the stuff bit. Since the stuff rate is, in general, not synchronous with the superframe rate, this leads to additional stuffing jitter, which is called "waiting" jitter. The waiting jitter peak-to-peak amplitude equals the stuff rate divided by the control word rate. The wrost case occurs for the maximum stuff rate, considering variations of the source group bit rate and of the synchronous group bit rate, which is a fixed fraction of the supergroup bit rate. The control word rate for one group equals the superframe rate for 96-channel mode and for 48-channel mode is twice the superframe rate (since there are four groups, but eight control words per superframe). In both cases the control word rate is 1190 ppm of the group rate. The maximum stuff rate is 177 ppm. Therefore, the peak-to-peak waiting jitter is 177/1190 = 0.149 bit period.

The stuffing jitter, since it reacts to the elastic store phase difference, follows (or reproduces) frequency components of the source jitter and clock recovery jitter which are slower than the superframe rate. There is no reaction to the group format jitter because the format jitter and the phase sampling are both periodic and have the same period (one superframe). The reaction to jitter components faster than the superframe rate depends on the method of phase sampling. If the stuff/don't stuff decision is based on the phase difference at some instant fixed in the superframe (instantaneous sampling), then the fast components of source jitter and clock recovery jitter will produce slower components of additional stuffing jitter having the same peak-to-peak amplitude. If instead, the stuff/don't-stuff decision is based on whether the phase difference passes under the threshold any time during the previous superframe (continuous sampling), then a DC component equal to the peak amplitude of the fast component is produced. The continuous phase sampling method is proposed herein because less jitter is propagated in a tandem connection of asynchronous multiplexers and demultiplexers.

D. Input Clock Recovery Module (FIG. 6)

Figures 6, 9, 10:
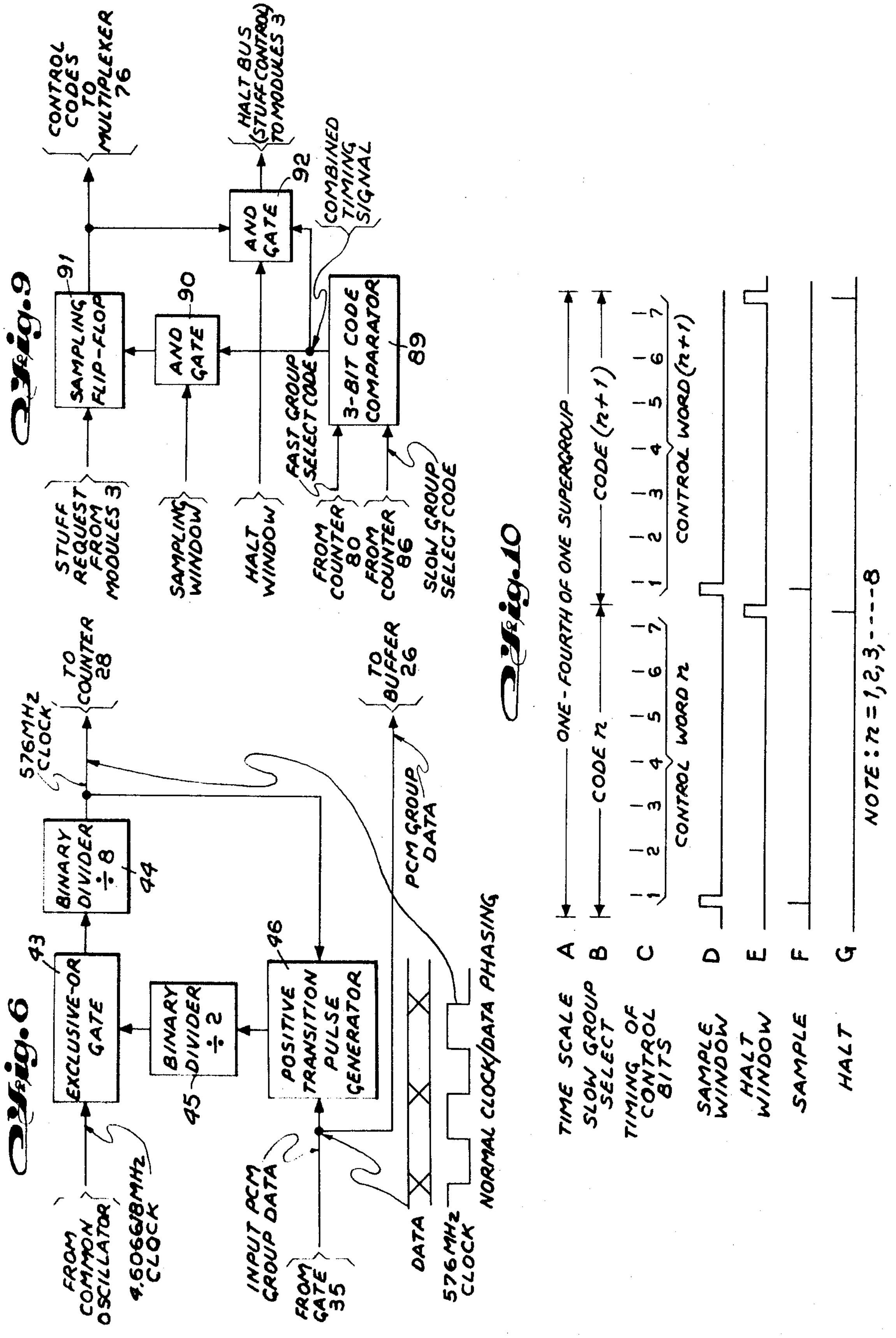
FIG. 6 is a block diagram of the clock recovering module of FIG. 5.
FIG. 9 is a block diagram of the stuff control circuit of FIG. 8.
FIG. 10 is a timing diagram useful in explaining the operation of FIG. 9.

Clock recovery module 36 of FIG. 5 is illustrated in block diagram form in FIG. 6. The PCM gtoup input, at either 288 or 576 Kb/s is received from gate 35 without an associated bit timing signal. In order to clock the data into buffer 26 by counter 28, it is required to extract or recover timing from the data transitions. Since there are four groups maximum in the 48-channel mode and eight group maximum in the 96-channel mode, each group signal can be treated as a 576 Kb/s group and no switching is required for group bit rate selection.

A digital clock recovery scheme is proposed for the following reasons: (1) A fairly large amount of fast jitter, characteristic of a digital clock recovery scheme, can be easily absorbed by elastic store 25. The jitter is kept to a reasonable minimum by dividing by 8 from a reference clock approximately 8 times the group bit rate. The clock recovery system to be described hereinbelow will have a 1/16 bit jitter. (2) The per-group equipment consists of three dual-in-line logic packages, and one common reference oscillator is required for all eight input groups. A phase-locked loop type of clock recovery with the requirements of a separate voltage-controlled oscillator per group would cost as much as the digital system does for all eight groups. Individual ringing filter type of clock recovery systems require a data transition at a rate not guaranteed for the full baud PCM group signal. An injection locked-oscillator used on a one per group basis would have to have the accuracy and stability equal to that used for the common source in the digital clock recovery scheme and the total price would be about eight times the cost. (3) Because of the similarity of this scheme and the heterodyne circuit proposed for the output clock smoother contained in modules 21, the same common reference oscillator can be used for the transmit clock recovery and receive clock smoothing. (4) The input rate variation of plus or minus 45 ppm is easily accommodated by a simple digital clock recovery. If the reference clock is specified at 300 ppm below 8 times the nominal bt rate (4.608 MHz) plus or minus 10 ppm then the difference between one-eighth of the reference frequency and the data rate will vary between 245 and 355 ppm. With the maximum difference of 355 ppm, it will take over 2820 baud periods for an uncorrected clock to drift one baud relative to the data. One-half cycle phase corrections are made at eight times the nominal rate which is then divided by eight to produce corrections which are 1/16 bit "jumps" at the data rate. This means that there is required a positive data transition once every 176 baud periods to keep the jitter equal to or less than 1/16 bit peak-to-peak. The circuit can tolerate a period of no transition for as long as about 1230 bit period without losing sync.

The operation of the digital clock recovery scheme involves EXCLUSIVE-OR gate 43, binary divide-by-eight divider 44, a binary divide-by-two dividier 45 and a positive transition pulse generator 46. Generator 46 generates a narrow pulse from the positive data transitions if the 576 Kb/s clock signal to counter 28 is high (logic one) at the time of the transition. This narrow pulse triggers counter 45 whose output goes to gate 43 and reverses the phase of the reference clock from the common oscillator as it passes through gate 43. This in effect adds a half-cycle phase shift to the input to divider 44 and causes a 1/16 bit advance in the otherwise smooth output of divider 44. This tends to maintain the nominal clock/data phasing as shown in FIG. 6, with the clock phase slowly drifting behind the data phase until the correction is made to produce the 1/16 advance. The reference clock input to gate 43 is eight times the nominal data rate less than 300 ppm mentioned above, in other words, a 4.606618 MHz square wave.

Although this circuitry of FIG. 6 is a sort of phase-locked loop there are no critical logic delays involved as the signals propagate through gate 43, divider 44 and back through generator 46. This is becuase the transistor transistor logic used is quite fast compared to the 576 Kb/s clock signal, and if there is a "race" condition between the two inputs to gate 43 which causes a correction signal to be "lost", the clock and data phases will simply drift a few more nanoseconds apart until the correction signal becomes effective.

Figure 7:
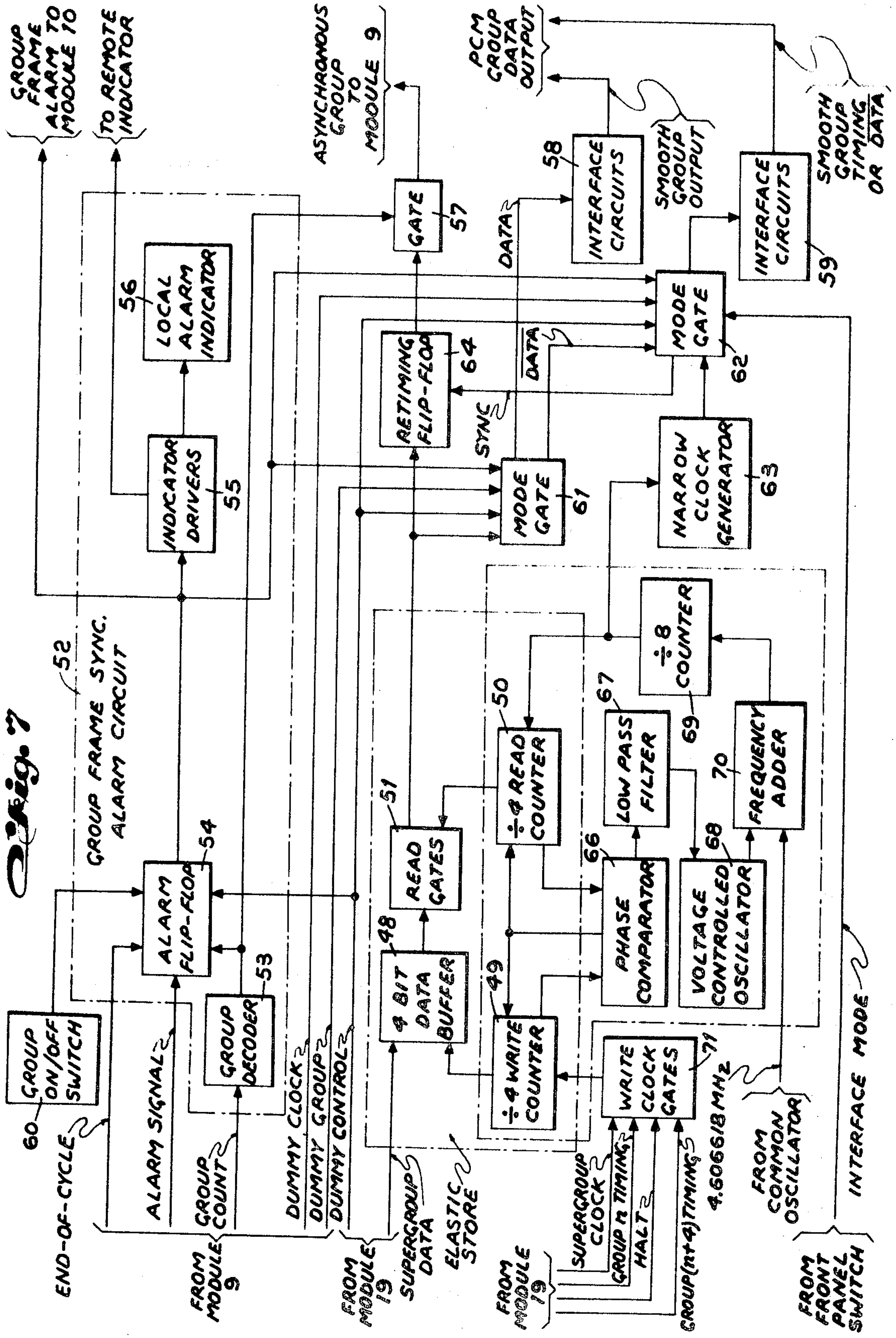
FIG. 7 is a block diagram of a receive group module of FIG. 4.

E. Receive Group Module (FIG. 7)

Receive group module 21 (FIG. 4) performs functions opposite those of the transmit group module 3 (FIGS. 4 and 5). That is, the group data stream must be separated, or demultiplexed, out of the supergroup bit stream. The "stuff" bits must be removed to produce a replica of the original group input to multiplexer 1 and in addition the jitter produced by the stuff/destuff process must be removed sufficiently to meet system requirements.

Elastic store 46 employs the same type of four-bit, steered-input, steered-output data buffer 48. Group timing from module 19 (FIG. 4) is decoded in the same manner as in the transmit group module 3, only now it is the write clock produced by write counter 49 which is controlled through write clock gates 71. Stuff bits are deleted by the HALT command from the common destuff control circuit of module 19. The HALT command inhibits the clock pulse corresponding to the "stuff" bit, thereby preventing its entry into buffer 48. Write counter 49 and read counter 50 are of the same design as those in transmit group module 3, but a different type of phase comparator controls the phase-locked loop (PLL) or smoother. Write and read counters 49 and 50 and phase comparator 66 are part of the PLL. The PLL produces the smoothed timing required to read the data out of buffer 48 by controlling read gates 51 as described hereinbelow.

The group frame sync alarm circuit 52 is basically the same as in the transmit group module 3 and includes therein group decoder 53, alarm flip flop 54, indicator drivers 55 and local alarm indicator 56. In fact, some of the group select decoding is shared with the transmit portion. The output of group decoder 53 controls the gating of the asynchronous group data to module 9 (FIG. 4) by means of gate 57. Alarm flip flop 54 is enabled and set or reset in the same manner and performs the same functions as in the transmit module 3 (FIGS. 4 and 5). The one difference is that dummy timing in addition to dummy data must be gated into the output interface circuits 58 and 59. Indicator drivers 55 activate both local alarm indicator 56 and a remote alarm indicator. The output from flip flop 54 provides the group frame alarm which is coupled to module 10 (FIG. 4). The group on/off switch 60 mentioned in connection with module 3 (FIG. 5) inhibits alarm flip flop 54 when in the OFF position.

The dummy control signal from module 19 (FIG. 4) causes the dummy data and timing to be switched into the output interfaces 58 and 59 whenever there is a supergroup frame or receive common alarm condition through means of mode gates 61 and 62.

Mode gates 61 and 62 are simple AND gates which select the elastic store 47 outputs and timing from read gates 51 and narrow clock generator 63, respectively, or the dummy data and timing. In addition, the interface mode from a front panel switch makes an additional selection in mode gate 62 between timing or data-not signals at interface circuit 59.

Also, a synchronizing signal is required to maintain correct timing relationship between the two interface signals. This signal goes from mode gate 62 to the retiming flip flop 64 prior to gate 57.

The receive group modules 21 include a clock smoother 65 to produce a smooth read clock with the same frequency as the write clock.

A heterodyne type analog smoother has been selected since its performance is nearly identical to an analog smoother, but is smaller in size and cost, although larger than a digital smoother.

The clock smoother 65 incorporated in the present invention employs a phase/frequency comparator which includes write counter 49 and read counter 50 (which are also part of elastic 47) and phase comparator 66. Phase comparator 66 is an edge-triggered flip flop which is set and reset by the respective inputs. The duty-cycle, and thus the low frequency component, of the flip flop output is proportional to the phase difference of the inputs. Augmenting the phase comparator 66 with write and read counters 49 and 50, two divide-by-two counters and a few gates extends the linear phase response of comparator 66. This simple circuit modification permits linear response to large phase errors and also detection of frequency difference. When there is a frequency difference, the DC component depends on the direction (not magnitude) of the frequency difference, and is used to move the output, or read clock, frequency toward the input, or write clock, frequency.

The phase lag filter 67 coupled to the output of phase comparator 66 has virtually no response to the high frequency components of the comparator output and thus responds only to the duty cycle of the comparator output, that is, to the phase error. The forward DC gain of the loop is made large enough to obtain a negligible phase error, such as 0.01 cycle, for the maximum frequency error. The forward loop gain is the product of the comparator gain (typically 4 volts/cycle), the DC gain of the active phase-lag filter 67 (typically 125 volt-/volt), the gain of the voltage controlled oscillator 68 (typically 1.4 KHz/volt) and the dividing ratio of divide-by-eight counter 69. The AC parameters of the filter, together with the forward loop gain determine the jitter bandwidth of the smoother, the peak jitter gain and the transient response. The 3-db (decibel) jitter bandwidth will typically be 2 ppm of the group rate and the peak jitter gain equal to 1.05. This slight gain for jitter at some low frequencies is necessary to obtain a small jitter bandwidth compared to the maximum source frequency error.

Oscillator 68 operates over a wide range of low frequencies (typically 1382 ± 691 Hz (hertz)) and has an approximately linear frequency vs. voltage response over this range. The frequency adder circuit 70 adds the frequency of the output of oscillator 68 to the common reference clock frequency from the common oscillator. The common clock reference frequency is obtained from the common oscillator shared by all group circuits. The PLL must correct for the sum of the source frequency error and the reference frequency error, thus, the reference frequency error is kept as small as possible (within ±10 ppm). The nominal reference frequency is chosen to be somewhat less (minus 300 ppm) than eight times the group rate (8 × 576 KHz = 4608 KHz). The frequency of oscillator 68 makes up the difference in nominal rates as well as adjusting for the frequency error.

Adder 70 is a very inexpensive heterodyning circuit. It is based on the principle that an EXCLUSIVE-OR gate sums the transition rates of its inputs, as long as no two transitions occur simultaneously. Since two transitions equal one cycle, frequencies are also summed. To avoid simultaneous transitions, the slower clock output from oscillator 68 is retimed by the faster reference clock, which is delayed by a slow gate. The phase of the sum frequency suddenly shifts one-half cycle for each transition of the slower clock from oscillator 68. Counter 69 translates the sum frequency to the group clock frequency, where the phase shifts are only one-sixteenth of one cycle. It is the use of counter 69 to reduce the size of the phase shift (also called heterodyne jitter) that makes it necessary to use a reference clock which is roughly eight times faster than the group rate. The 300 ppm offset of the reference frequency determines the nominal frequency of the clock output of oscillator 68, and, thus, also the frequency of the heterodyne jitter.

The receive elastic store operation is basically similar to the transmit elastic store. The stuffing control circuit controls the read clock of the transmit elastic store to prevent overflow or underflow of the storage. Clock smoother 65 controls the write clock of the receive elastic store for the same reason. In both cases, the input to the controlling circuit is the phase difference of the read and write timing. The stuffing control circuit reproduces jitter frequencies up to about 1190 ppm of the group rate, but the clock smoother mainly reproduces only jitter below about 5 ppm.

The output jitter of elastic store 47 is transmitted via the control channel, except the format jitter which is reproduced by similar timing circuits in demultiplexer 2. The destuff control circuit contained in module 19 removes the stuff bits from the data and reproduces the stuffing jitter from the elastic store 47.

The timing of the data going into a receive elastic store is determined by the group data format and by the destuffing adjustments determined by codes received in the corresponding control subchannel. Thus, this timing has group format jitter and stuffing jitter. Clock smoother 65 reproduces the bit rate frequency but attenuates most of the jitter, generating a read clock for elastic store 47. Receive elastic store 47 allows the data to make the transition from the jittery timing (write clock) to the smooth timing (read clock).

For proper operation of the elastic store, clock smoother 65 must produce a frequency exactly equal to the receive bit rate as adjusted by deleting stuff bits, for any allowable source frequency error, and the phase of the clock produced should not shift very much when the source frequency error varies between specified limits. This phase shift contributes to the capacity requirement of receive elastic store 47.

As mentioned hereinabove, smoother 65 is a heterodyne type analog PLL. The size and cost of the voltage controlled oscillator portion of the PLL circuit is reduced by using a common circuit to establish a stable reference nominal frequency, and individual circuits (one per receive group module) to combine the stable common reference frequency with the individual frequency correction required for required PLL circuit. The heterodyne type PLL circuit has been selected because of its economic advantage over an analog PLL. The heterodyne type PLL is functionally identical to the analog PLL except that the voltage controlled oscillator is replaced by a heterodyne voltage controlled oscillator. This circuit comprises a wide-range, low-frequency voltage controlled oscillator 68, a frequency adder 70 or a frequency subtractor and a frequency divider (divide-by-M counter), such as divide-by-eight counter 69. These functions can be realized with presently available medium-scale integrated circuits at about one-half or one-fourth of the cost of the high stability voltage controlled oscillator required in the analog PLL. The voltage controlled oscillator 68 operates over a range of frequencies M times the range required for the read clock, which is at typically 150 ppm of 576 KHz. The center frequency of voltage controlled oscillator 68 is typically about twice its range, so that high stability is not required. When frequency adder 70 is used, the nominal frequency of the common oscillator is made slightly lower than M times the nominal read clock frequency (576 KHz), so that when the low frequency is added and the sum divided by M, a 576 KHz read clock is obtained. Similarly, if a frequency subtractor is used in place of adder 70, the common frequency is made slightly higher than M times 576 KHz.

The heterodyne analog PLL can be designed to perform identically to the analog PLL, except that heterodyne jitter is produced, if the frequency adder or subtractor is not phase-linear. For example, if the voltage controlled oscillator has a different gain, the gain of the filter can be changed to obtain the same loop gain.

The frequency dividing function is not required if the frequency adder or subtractor is phase-linear. However, the high and low frequencies are more economically added or subtracted by a digital logic means, which is not phase linear. An AND, NAND, OR, or NOR gate can be used to add low-frequency pulses to the high-frequency clock, or to delete pulses from the high-frequency clock at the low-frequency rate. A third logic technique combines two clock signals with an EXCLUSIVE-OR gate. The EXCLUSIVE-OR function has the unique property that a transition (change of logic level) in any direction on any one input at any time produces a transition on the output. Thus, the transition rate of the output is the sum of the transition rates of the inputs. Regardless of frequency or duty cycle, there are always two transitions per cycle. Therefore, the frequencies are also summed.

In general, the high frequency is not synchronous to any mutiple of the low frequency. For proper operation of any of the above three techniques, the low frequency clock must be synchronized by retiming (sampling) it with the high frequency clock prior to frequency adding of subtracting. For all three techniques, the phase of the output is changed suddenly one step at a time. If a pulse is added, the phase is suddenly advanced one cycle. If a pulse is deleted, the phase is suddenly retarded by one cycle. If 50 percent duty cycle clocks and an EXCLUSIVE-OR gate are used, each transition of the low frequency clock advances the phase one-half of the cycle. The jitter produced by these phase jumps is called "heterodyne jitter." To reduce this jitter, a divide-by-M counter is used, and the low and high frequencies are made M times higher. This decreases the jitter by the ratio M.

The EXCLUSIVE-OR technique is proposed, because it produces half as much jitter as the other techniques, and also because the duty cycle of the clocks presents an easier design problem. Using a divide-by-eight counter, such as counter 69, the peak-to-peak heterodyne jitter on the read clock will be 6.25 percent of the read clock period, and the common oscillator frequency will be 4.608 MHz, minus approximately 300 ppm. The 300 ppm is chosen to make the minimum frequency of the low frequency voltage controlled oscillator high enough to keep the heterodyne jitter well above the group cable system bandwidth. The heterodyne jitter frequency for the PLL arrangement employed in this invention is about 2.7 KHz.

Figure 8:
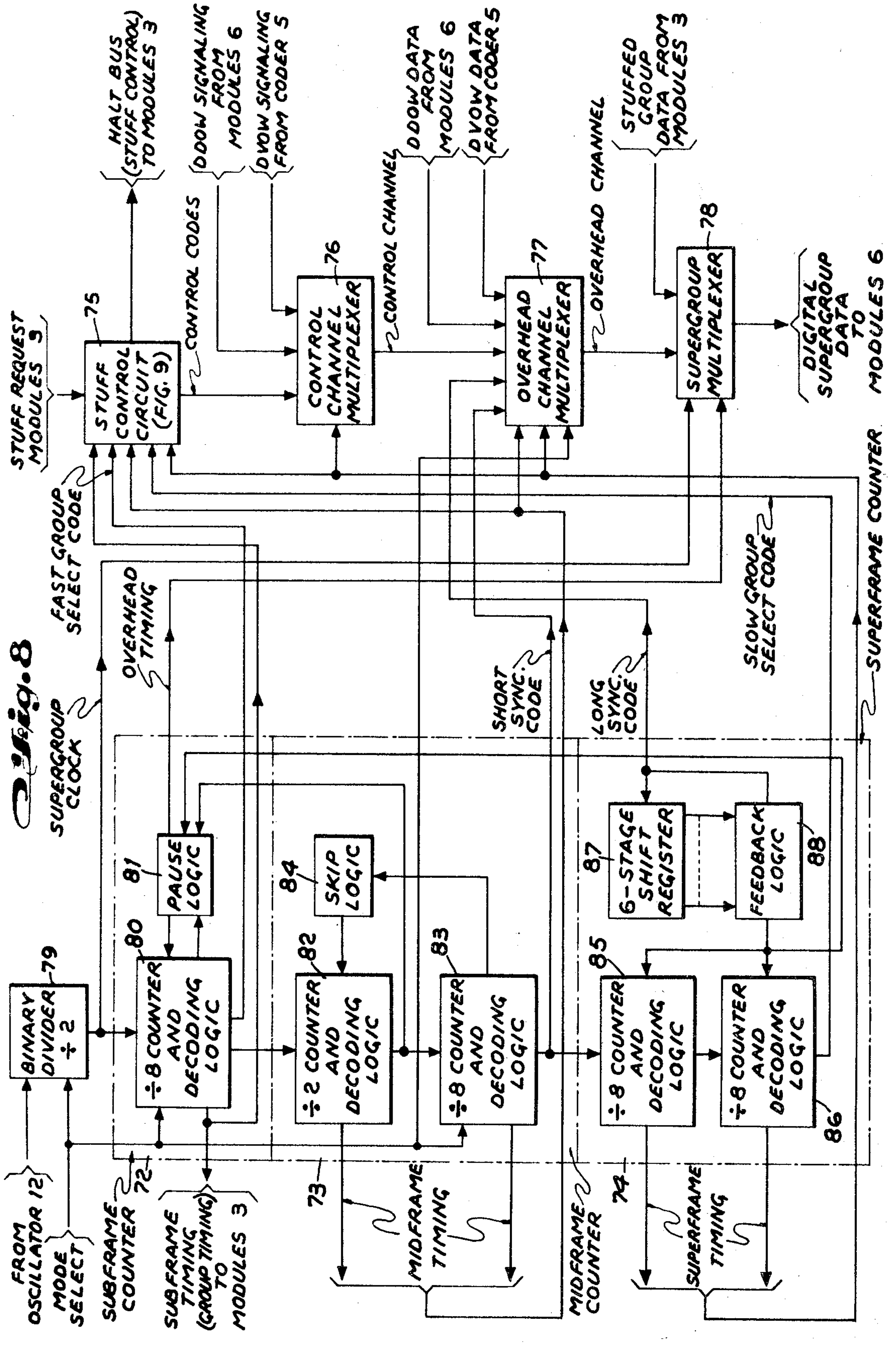
FIG. 8 is a block diagram of the transmit common module of FIG. 4.

F. Transmit Common Module (FIGS. 8, 9 and 10)

Referring first generally to FIG. 4, module 4 multiplexes all digital channels to generate a supergroup signal according to the data format illustrated and discussed with respect to FIGS. 1, 2 and 3. It also generates data format timing and synchronization codes, and controls the stuffing of group channels.

The implementation of module 4 is primarily determined by system considerations discussed in Section A hereinabove as follows: (1) stuffing control, (2) data format, (3) frame sync format, and (4) frame sync code.

A few additional considerations are necessary to obtain an economical logic implementation.

Prior art asynchronous multiplexer implementations used individual stuffing control circuits for each input PCM data group. In accordance with the present invention there is employed a common stuffing control for all the input data groups which proves to be more economical. Each of group modules 3 still requires its own phase comparator to generate stuff requests, and a read clock inhibit gate to generate stuff bits, but the logic to make the stuff decisions and to generate control words in synchronism with the data format appears once, rather than eight times. There is, however, the additional multiplexing of the stuff requests and demultiplexing of the stuff commands (HALT signal); but no multiplexing of control words is required, because all control words are generated by the same circuit. This cost is reduced by combining the timing of the group data multiplexing and the timing of the control word multiplexing, as will be described hereinafter, and using the combined timing signal in a way that reduces the logic and inter-module wiring required for stuff request multiplexing and stuff command demultiplexing.

The multiplexing of the group signals from modules 3 may be done in many ways, but a method has been chosen that reduces the inter-module wiring and the total number of group and common logic circuits. There are two methods that may be followed. All multiplexing on common module 4, or all multiplexing on group modules 3. For the second method, each group module 3 receives a timing signal phased differently than the other group circuits and places its data on a common data bus during the prescribed time interval. This method requires an inter-module interface with many timing signals and one data signal, whereas the first method requires many data signals but no timing signals. However, timing signals are required in either case to operate the read counters of module 3. Therefore, the second method has been employed herein. Furthermore, a thorough study of possible logic configurations shows that a partial decoding of the group select or group number timing on the common module 4, with a completion of the decoding on group modules 3 gives the smallest total number of circuits and smallest total number of inter-module connections.

The coded digital voice orderwire signal is word-organized, and the six-bit PCM word format must be synchronized to the supergroup data format. To accomplish this, common module 4 sends a sync or timing signal to the PCM coder to synchronize a divide-by-six counter in the PCM coder by resetting it at the proper time. Putting the divide-by-six counter in the PCM coder rather than in module 4 provides a simpler interface and permits stand-alone operation and testing of the PCM coder. The remaining overhead channels (not including control words) operate asynchronously and require no timing signals from module 4.

Since the data format of the present invention is based on binary powers (the numbers 2, 4, 8, 16, 32, 64 . . . ), there is a greater opportunity to use standard integrated circuits for complete counting and multiplexing functions in the logic implementation, rather than implementing these functions with individual flip flop and gate circuits. This approach reduces logic cost, space and power.

Turning now to FIG. 8, there is disclosed therein in block diagram form subframe counter 72, midframe counter 73, superframe counter 74, stuff control circuit 75, control channel multiplexer 76, overhead channel multiplexer 77 and supergroup multiplexer 78. Trnasmit common module 4 as illustrated in FIG. 8 implements the data format shown in FIGS. 1, 2 and 3 and described with respect thereto in Section A. These format diagrams are essentially timing diagrams for the various counters and decoding logic and the multiplexers.

The decoding logic associated with each of the binary counters of FIG. 8 can be a matrix of AND gates coupled to appropriate outputs of the flip flop stages of the counters to define all the bit positions of the associated subframes, midframes and superframes as illustrated in the data format of FIGS. 1, 2 and 3.

All of the timing for the counters 72–74 is derived from the 4.9152 MHz clock signal provided by a fixed frequency, highly stable (±10 ppm) oscillator 12. The divide-by-two clock divider 79 is enabled or disabled by the mode select DC signal to enable a supergroup clock with the output thereof having a frequency of 2.4576 MHz for 48-channel mode and 4.9152 MHz for 96-channel mode.

Subframe counter 72 includes a divide-by-eight counter and decoding logic 80 with pause logic 81. The pause logic 81 stops counter 80 for one clock period, thus creating a ninth count, whenever enabled by an output from the midframe and an output from the superframe counter 74 as illustrated. This causes the subframe to be either eight or nine bits long according to the data format. The pause timing also provides timing for the overhead channel. The mode select signal modifies the decoding of the subframe timing to select each of group 1 though 8 once per subframe for 96-channel mode, and to select each of groups 1 through 4 twice per subframe for 48-channel mode. The subframe timing thus includes a cyclic sequence of three-bit group select codes which are used by the group circuit for group timing signals and used by the stuff control logic as explained hereinbelow. These will be called "fast group select codes."

Midframe counter 73 is a divide-by-15 counter, but is constructed as a binary coded divide-by-16 counter including divide-by-two counter and decoding logic 82 and divide-by-eight counter and decoding logic 83 with skip logic 84 arranged to skip the 16th count. The output of counter 82 is used to enable pause logic 81. The midframe timing is decoded as required to select the various overhead subchannels according to the data format.

Superframe counter 74 is, in effect, two divide-by-64 counters operated by the same clock. One divide-by-64 counter is a string of six divide-by-2 circuits which are conveniently illustrated as divide-by-8 counter and decoding logic 85 and divide-by-8 counter and decoding logic 86. The other divide-by-64 counter is a six-stage shift register 87 with feedback logic 88 designed to produce a pseudo-random sequence of 64 bits (the long sync code). One pulse per cycle from the long sync code generator is used to reset the first divide-by-64 counter (counters 85 and 86), thus keeping both counters synchronized to one another. Counter 85 defines the timing of each eight-bit word of the control channel (a seven-bit control word and a signalling bit). Counter 86 defines the multiplexing of eight such words in each superframe. Counter 86 thus gnerates a cyclic sequence of three-bit group select codes similar to those generated by subframe counter 72, except that the timing is slower, so that the codes may be used by stuff control circuit 75 to identify control words. These latter three-bit codes are called "slow group select codes."

FIG. 8 also shows, as mentioned above, stuff control circuit 75 and multiplexer circuits 76–78 of module 4 (FIG. 4). The multiplexing of group data and stuff requests is accomplished by the group circuits, which get the required group timing from the subframe counter 72 and place the stuffed group data on a common data bus and the stuff requests on another common bus. This greatly reduces the number of connections between module 3 and module 4, and also reduces the total count of integrated circuits. The stuff request bus signal indicates the threshold condition of the relative phase of the read and write clocks contained in module 3 (FIG. 5). Since each group of these modules 3 places its stuff request on the bus at a different time, the group identity is given by the timing of the information on the stuff request bus.

By multiplexing the stuff requests at the same rate as the group data, no additional inter-module connections (timing signals) are required, and only one gate per group module is needed. It would appear that this is the wrong rate for multiplexing the stuff requests; and that the correct rate would be the control word rate. However, this is part of a scheme that reduces the total logic requirement. As illustrated in FIG. 9, a "combined timing" signal is used to make the stuff request timing compatible with the control word timing. The combined timing signal is generated by comparing the fast group select codes generated in counter 72 (before the codes are modified by the mode select signal) with the slow group select codes generated by counter 86 of superframe counter 74. A pulse is generated whenever the slow and fast three-bit codes match in comparator 89. These combined timing pulses occur 120 times per superframe for both 96-channel mode and 48-channel mode.

The sample window timing pulse and the HALT timing window pulse are also generated as illustrated in curves D and E, FIG. 10, respectively. Each of these window timing pulses has eight pulses per superframe, occurring between control words; and each pulse is eight supergroup bit periods wide, spanning exactly one group multiplexing cycle. The HALT window pulse and the sample window pulse differ in that one pulse occurs soon before the select group code changes, and the other pulse occurs soon after the code changes. The combined timing signal is not shown in FIG. 10 because the necessary detail would not be clear at the time scale employed in FIG. 10. The combined timing signal or pulse occurs once during each window pulse; and is located within the width of the window pulse according to the group select code. (It cannot be stated which of the group select codes is within the window pulse, because the slow and fast codes are the same at this time). A combined timing pulse occurs at the beginning of a window pulse for group one, and at the end of a window pulse for group eight.

AND gate 90 responds to the sample window signal and the combined timing signal to generate eight sample pulses per superframe as illustrated in Curve F, FIG. 10. The output pulses from AND gate 90 trigger a D-type sampling flip flop 91 to sample the stuff request bus, as shown in FIG. 9. It is apparent from FIG. 10 that the sample pulse of Curve F preceding control word *n* occurs when the slow group select code is code *n*. Since sample pulses can occur only when the slow code and fast code match, the fast code must also be code *n* at the time of sampling. Since each group module 3 gates its stuff request onto the stuff request bus when selected by the fast code (also called "group timing"), the stuff control will sample the stuff request of group circuit *n* prior to sending control words *n*. Flip flop 91 remains in the "one" sate or "zero" state between sampling pulses, depending on whether or not there was a stuff request at the timing of sampling. The multiplexer 76 (FIG. 8) samples the output signal of flip flop 91 seven times during this interval, thus generating either a 1111111 stuff control or a 0000000 don't stuff control for a seven-bit control word.

After the control word, but before the slow code changes, a HALT pulse is generated as illustrated in Curve G, FIG. 10 if the control code was "stuff" (sampling flip flop 91 in the "one" state). As illustrated in FIG. 9, AND gate 92 is enabled by the combined timing signal and the HALT window and, therefore, the HALT pulse will occur when the fast code is code *n*, which is the timing of the read clock for group *n*. Thus, even through one HALT signal is connected to all group circuits, this HALT pulse will inhibit a read clock pulse in group *n* only. This operation generates a stuff bit. The HALT window pulse, as illustrated in FIG. 9, is also a necessary condition to generate the halt pulse to ensure that there will be only one HALT pulse and, thus, only one stuff bit for each stuff control word. The control word precedes the HALT pulse and stuff bit to allow module 19 which receives the control word to anticipate the stuff bit and remove it (destuff).

The simplicity of stuff control circuit 75 as illustrated in FIG. 9 is apparent from FIG. 9. The same stuff control timing is used for both 48-and 96-channel modes. However, in the 48-channel mode, group modules *n* (where *n* = 1, 2, 3, 4 only) responds to fast code (*n*+4) as well as fast code *n*. (Also, group modules numbers 5, 6, 7 and 8 are inhibited). Thus, when fast code (*n*+4) matches slow code (*n*+4), group modules *n* will use control word (*n*+4). For both 48- and 96-channel mode, each group has a control word rate of 4800 words per sec.

Multiplexer 76 shown in FIG. 8 responds to the superframe timing to multiplex the control codes from circuit 75 with the DDOW signalling and DVOW signalling signals, producing the control channel according to the data format illustrated in FIG. 3. Each signalling signal is a binary signal that infrequently changes state, and is sampled into a 1200 b/s (bit per second) (48-channel mode) or 2400 b/s (96-channel mode) channel.

Multiplexer 77 responding to midframe timing superframe timing and mode select to multiplex the control channel, DDOW data, DVOW data, short sync code and long sync code to produce the overhead channel according to the data format as illustrated in Curve B, FIG. 1. The sync codes are generated by the timing counters, namely, counter 83 for the short sync code and register 87 and feedback logic 88 for the long sync code. The DVOW signal is the serial binary output of coder 5(FIG. 4). The bit rate of this signal is synchronous with the data format, because a 57.6 KHz clock is generated from the midframe timing, superframe timing and mode select. The timing of this clock is shown in Curves A and B, FIG. 2 wherein one clock pulse per DVOW bit is shown. Synchronization of the six-bit PCM word is obtained by resetting the divide-by-six counter in PCM coder 5 with a sync pulse generated once per superframe by the timing counters. The DDOW signal is from module 6. The data is asynchronously sampled into the synchronous channel allocated by the format, generating a timing uncertainty for each data transition. The subframe timing, as described hereinabove, is sent to all group modules 3 for the selection of groups for group data multiplexing, and one common data signal is returned, which is a multiplexing of all group data including stuff bits. This common signal is called herein "stuffed group data."

Multiplexer 78 responding to the supergroup clock from divider 79 and the overhead timing from logic 81 multiplex the stuffed group data and the overhead channel according to the data format as illustrated in Curve C, FIG. 1. The resulting supergroup data is retimed by the supergroup clock and sent to module 6 (FIG. 4).

G. Receive Common Module (FIG. 11A)

Figure 11A:
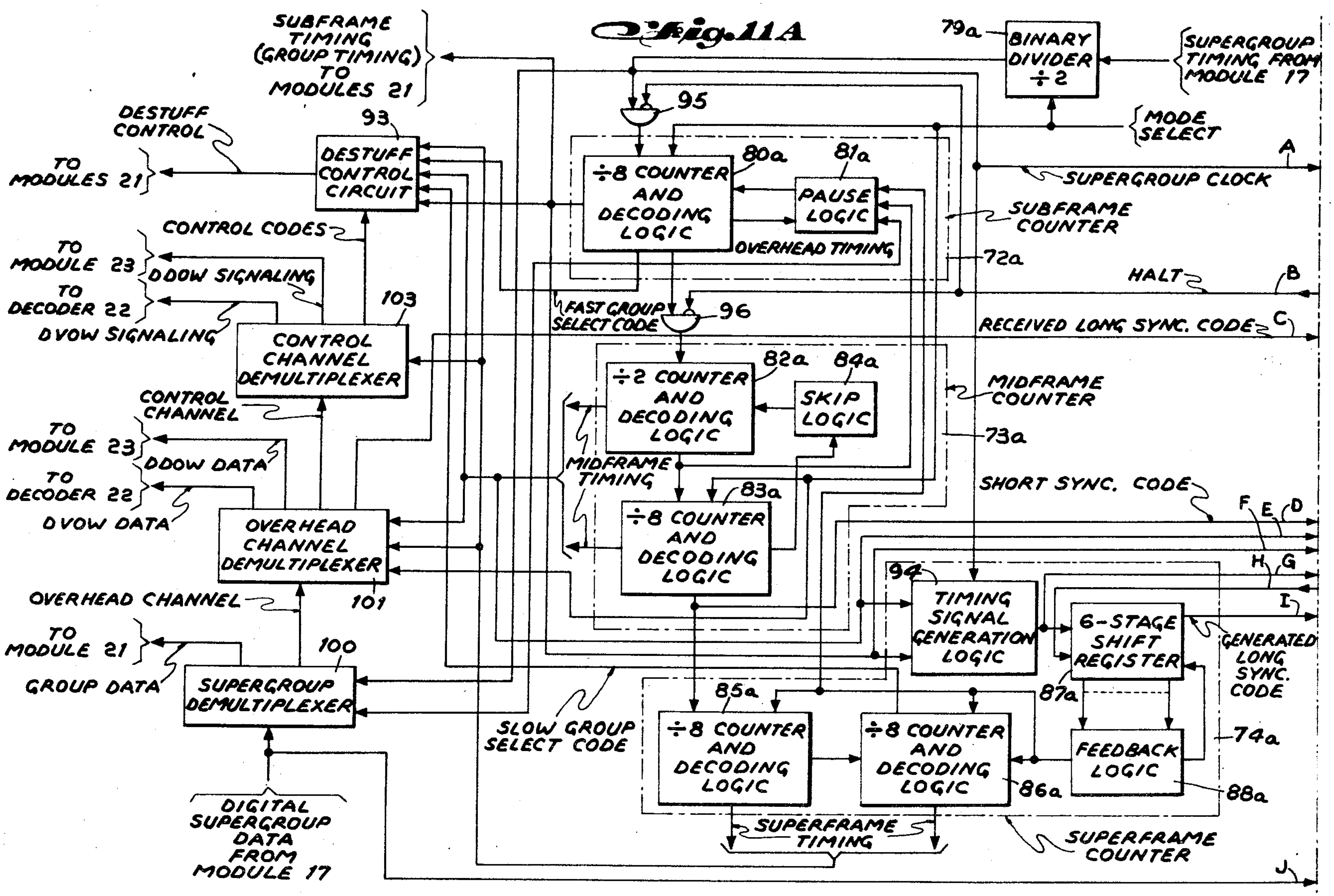
FIG. 11A and 11B, when organized as illustrated in FIG. 11C, is a block diagram of the receive common module and supergroup frame recovering module of FIG. 4.

The receive common module 19 is illustrated in FIG. 11A in block diagram 11 and has the purpose of demultiplexing all of digital channels from the received supergroup signal according to the data format. It also generates the required data format timing, and controls the destuffing of group channels. Synchronization of the format timing to the format of the received data is achieved under control of frame recovery module 20 which is illustrated in block diagram form in FIG. 11B and will cooperate with the arrangement of FIG. 11A when organized according to FIG. 11C. The operation of FIG. 11B will be discussed in detail hereinbelow in section H.

The considerations for module 19 and the block diagram of FIG. 11A are the same in principle as module 4 and the block diagram of FIG. 8 described hereinabove in section F. A common destuff control circuit 93 is used for destuff control for the same reasons as for the common stuff control circuit 75 of FIG. 8, and operates under similar principles. The description of FIG. 11A and the demultiplexers will be described hereinbelow as variations in the transmit functions of FIG. 8 to save repeating most of the description in Section F. The receive timing counters include subframe counter **72*a*, midframe counter 73*a* and superframe counter 74*a*. Counter 72*a* includes counter and decoding logic 80*a* and pause logic 81*a*, counter 73*a* includes counter logic 82*a* and counter and decoding logic 83*a* together with skip logic 84*a* and counter 74*a* includes counters and decoding logic 85*a* and 86*a*, shift register 87*a* and feedback logic 88*a*. The decription of the various counters and decoding logic as well as the other common circuits present in FIG. 11A** operate and are provided for the same reasons as described in Section F.

Superframe counter **74*a* also includes timing signal generation logic 94 responsive to the subframe timing, the midframe timing and the supergroup clock to produce a clock during synchronization time ST to control the shifting of the long sync code into shift register 87*a* when shift register 87*a* is being loaded by the received long sync code in the manner described hereinbelow in Section G describing FIG. 11B. The primary difference between the various counters and decoding logic circuitry of FIG. 11A and FIG. 8 are that (1) the 4.9152 MHz clock is obtained from the receive clock recovery circuit contained in module 17 (FIG. 4); (2) the decoding requirements differ slightly and, therefore, the decoding logic differs somewhat; and (3) provisions are included for the phase of the counters to be changed by the framing circuit of FIG. 11B through the means of inhibit circuitry, such as INHIBIT gates 95 and 96. INHIBIT gate 95 disposed between binary divider 79*a* and counter 72*a* and INHIBIT gate 96 disposed between counter 80*a* and counter 82*a* receives a HALT or inhibit input from the short sync search logic 97 of FIG. 11B which when enabled, causes the receive timing counters 72*a* to 74*a*** to stop counting. Since the received data does not stop, the received timing phase relative to the received data will lag one more bit (or lead one less bit) for each bit period during which the inhibit signal is enabled.

The feedback loop of the long sync generator including register 87*a* and feedback logic 88*a* is not closed within counter 74*a*, as in the transmit common module of FIG. 8. Instead the generated long sync code of register 87*a* is sent to the long sync framing circuit of FIG. 11B including switch logic 98 and long sync digital comparator 99, which returns a signal to the input of shift register 87*a*. In one mode operation of the long sync framing circuit of FIG. 11B, the output of register 87*a* is returned to the shift register input, and the long sync generator counts in a normal manner, as in the transmit common module. In a second mode of operation of the long sync framing circuit, the received sync code is sent to the shift register input when switch logic 98 is in the position other than illustrated. The long sync code generator becomes synchronized as soon as six error-free long sync bits are recieved and are shifted into shift register 87*a*. The binary-coded divide-by-64 part of counter 74*a* (counters 85*a* and 86*a*) is synchronized by signals generated from the shift register one, two or four times per superframe.

The receive demultiplexers are similar to the transmit multiplexers except that the data flows in the opposite direction. The supergroup data is demultiplexed in demultiplexer 100 into the overhead channel and received group data. The receive group data is demultiplexed by the receive group module 21. The overhead channel is demultiplexed in demultiplexer 101 into the DDOW data, DVOW data, control channel and long sync code. The short sync code is demultiplexed directly from the supergroup data by the short sync framing circuit of FIG. 11B which includes logic 97 and short sync digital comparator 102. The control channel is demultiplexed by demultiplexer 103 into DDOW signalling, DVOW signalling and control codes. The control codes are error-corrected by the destuff control circuit and a common HALT signal or destuff signal is sent to all receive group modules 21, demultiplexed by group modules 21 and used to delete stuff bits. The error correction is done by counting the "one" bits received for each control code. If four or more "ones" are counted, the code is interpreted as indicating "destuff." If three or less "one's" are counted, the code is interpreted to indicate "don't destuff." HALT window and combined timing signals identical to those described in Section F with regard to FIG. 9 are used to generate HALT pulses that match the timing of the HALT pulse used in the transmit common module of FIG. 8.

H. Supergroup Frame Recovery Module (FIG. 11B)

Figures 11B, 11C:
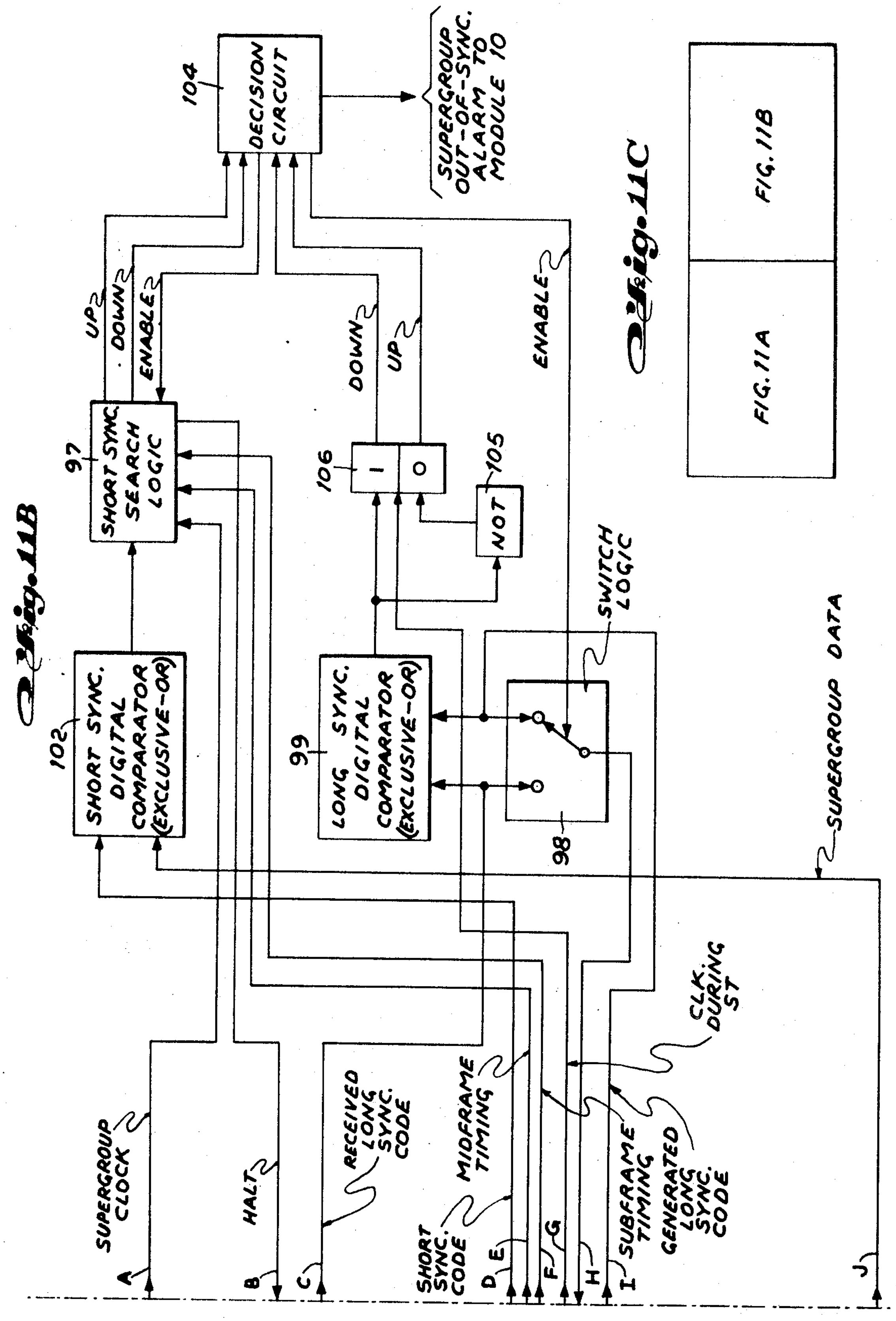

FIG. 11B is a block diagram of module 20 of FIG. 4 and when oriented with respect to FIG. 11A as illustrated in FIG. 11C there is provided a block diagram that illustrated the manner in which the counters 72*a* – 74*a* are synchronized with respect to the counters 72 and 74 in module 4 shown in detail in FIG. 8.

The supergroup data is compared continually with the short sync code generated by counter 73*a* in comparator 102. Comparator 102 may be an EXCLUSIVE-OR gate. The search logic 97, when enabled by the decision circuit 104 generates a HALT pulse whenever the midframe timing counters indicate that a short sync bit should be received and when the supergroup data does not match the generated short sync code at this time. A mismatch at this time also causes a "down" pulse to be sent to circuit 104. A match at this time generates an "up" pulse instead. The HALT signal is used to inhibit the counting of subframe counter 72*a* and midframe counter 73*a* through the means of the INHIBIT gates 95 and 96. A succession of mismatches will cause a continued HALTING condition until a match is detected, but no more "up" or "down" pulses are generated until the next time that a short sync bit should arrive. When search logic 97 is disabled, up or down pulses are generated depending upon the comparison obtained in comparator 102 when a sync bit is supposed to arrive, but no HALT pulses are allowed.

Decision circuit 104 is an up/down counter shared by the short sync and long sync portions of the framing logic. Its operation depends on whether the count is above or below certain thresholds. The "up" pulses are disabled in a region near the highest count. This prevents the counter of circuit 104 from cycling back to a low count. Similarly, "down" pulses are disabled in a region near the lowest count. There is a threshold near the center of the counter that separates the controlling action of the long sync and short sync circuits. Above this threshold, the counter of circuit 104 responds only to "up" and "down" pulses from the long sync circuit including comparator 99, NOT gate 105 and flip flop 106. Below this threshold, the counter of decision circuit 104 counts up or down as controlled only by the short sync circuit. In a lower portion of each of these two regions, the associated circuit is allowed to change the frame phase. In case of the short sync, HALT pulses are used to change the frame phase. In the case of the long sync, a "load mode" is used to load shift register 87*a* with the received long sync code when switch logic 98 is in the position other than that illustrated. Below another threshold, a supergroup out-of-sync alarm is enabled and coupled to module 10 (FIG. 4).

When synchronization is lost, mismatches cause down pulses, and after a while the state of circuit 104 is at or near the lowest count. Here, the short sync circuit is allowed to generate HALT pulses, which eventually correct the midframe phase. For the condition of correct midframe phase, there are more short sync matches than mismatches, and more "up" pulses than "down" pulses. The counter of circuit 104 then counts up to the point where it is controlled by the long sync circuit.

The operation of the long sync circuit will not be discussed. The achievement of correct long sync phase causes the count to continue upward, disabling the frame alarm. Bit errors can cause the search logic to make wrong decisions and may move the count in the wrong direction, but each bit error can change the count delay only slightly. Thus, the framing circuits can continue after an error from early the same state as before the error, or nearly the same as if the error had not occurred. In a similar manner, the counter of decision circuit 104 protects against bit errors when synchronized by preventing a false sensing of the out-of-sync condition.

The long sync framing circuit includes shift register 87*a* and feedback logic 88*a* and a feedback path through switch logic 98, which generates a long sync code in a manner similar to generation of the long sync code in the transmit common module as illustrated in FIG. 8 and described with respect thereto. The received long sync code is demultiplexed from the overhead channel in demultiplexer 101. This demultiplexing is correctly timed when the short sync code is synchronized, that is, when the midframe timing is correct. When the superframe timing is also correct, the received and the generated long sync codes will match, except, of course, for received bit errors. Long sync digital comparator 99 compares the received and generated long sync codes, and generates an "up" pulse if there is a match or a "down" pulse if there is a mismatch. Mismatches thus cause the count to decrease until an enable signal is generated by circuit 104 to operate switch logic 98. In FIG. 11A switch logic 98 is shown to be a mechanical switch only for the purpose of illustrating the function of the switch logic 98. It is to be understood that an electronic switching circuit would be employed for switch logic 98 rather than a mechanical switch. The disabled position of switch logic 98 is illustrated in FIG. 11B. The enable signal from circuit 104 switches the received long sync code to the input of shift register 87*a*. This condition may be called the "load mode," because the received long sync bits are loaded into the shift register, displacing the generated long sync bits previously stored. As soon as shift register 87*a* is filled with error free long sync bits, the generated long sync code will match the received long sync code without errors. The matches detected by comparator 99 cause "up" pulses to be generated, which increases the count and disables the "enable" signal. This causes the switch logic to gate generated long sync code to the input of shift register 87*a*. In this "feedback mode," the feedback path is closed, and the shift register continues to generate the long sync code with no dependence of the received long sync code, and, thus, unaffected by bit errors. This mode persists if register 87*a* is synchronized to the received long sync code. Counters 85*a* and 86*a* of the superframe counter 74*a* is synchronized by pulses generated from register 87*a*.

The frame alarm signal produced in decision circuit 104 is used for several purposes. This signal is sent to the alarm summary module 10 (FIG. 4) and used to operate alarms. It also goes to the PCM coder 5 and decoder 22 and the orderwire modules 6 and 23, (FIG. 4), where it is used to squelch the digital voice orderwire and the digital data or Teletype orderwire, respectively. The frame alarm signal is also distributed to all receive group modules 21 as a "dummy control" signal, and is used as a condition for inserting dummy signals on the output of the group modules, thus quieting the group alarms of cooperating multiplexers and demultiplexers which are connected in tandem with the group outputs.

The supergroup frame recovering module 20 (FIG. 4) illustrated in greater detail and described with respect to FIG. 11B is the subject matter of a copending application of J. M. Clark, Ser. No. 251,895, filed May 10, 1972, assigned to the same assignee as the present invention. The disclosure of this copending application is incorporated in the present application by reference.

I. Cable Demodulator, Timing Recovery and Orderwire Extraction Module (FIG. 12)

Figures 12, 13:
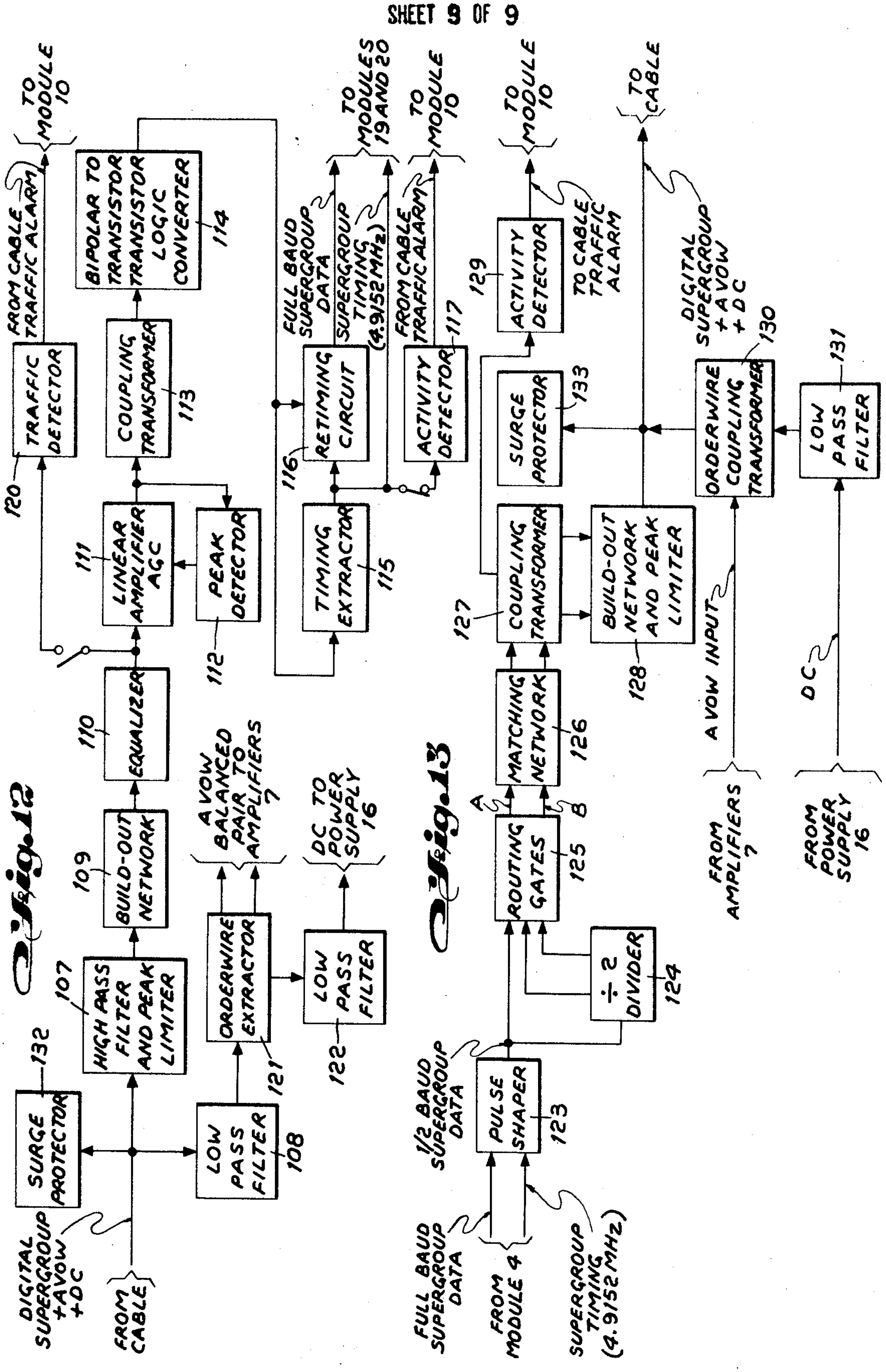
FIG. 12 is a block diagram of the cable demodulator, timing recovery and orderwire extraction module of FIG. 4.
FIG. 13 is a block diagram of the cable modulator and orderwire insertion module of FIG. 4.

Module 17 having the block diagram illustrated in FIG. 12 operates on the incoming signals (composite DC, analog orderwire and supergroup bipolar data) to separate these incoming signal into supergroup data, DC and analog orderwire by frequency selective high pass filter and peak limiter 107 and low pass filter 108. The output of filter and limiter 107 is coupled to buildout net work 109 to adjust the shape of the supergroup data due to the cable characteristics. Equalizer 110, linear amplifier 111, peak detector 112 and the coupling transformer 113 operate on the separated supergroup data to compensate for the distortion imparted thereto by the cable propagation path. The output of transformer 113 is coupled to a bipolar-to-transistor transistor logic converter 114 to provide the proper levels for the supergroup data for operation thereon by further circuitry. The timing of the supergroup data at the output of converter 114 is extracted in timing extractor 115 which employs a transistor to convert the output timing signal to transistor transistor logic levels for use in a D-type flip flop contained within retiming circuit 116. The output of extractor 115 is the supergroup timing (4.9152 MHz) and the output of retiming circuit 116 is full baud supergroup data properly timed for coupling to modules 19 and 20. With an extraction filter bandwidth in extractor 115 of 350 Hz, it will take less than four milliseconds to obtain sync 95 percent of the time. Activity detector 117 with switch 118 in the position illustrated is used to sense and indicates the presence of timing. Detector 117 employs a diode voltage doubler and a transistor pair to sense the presence of timing and will provide a cable traffic alarm for module 10 if timing is not present.

An alternative arrangement to detect the activity of the cable demodulator is provided by closing switch 119 so that the output of equalizer 110 is coupled to traffic detector 120. Traffic detector 120 is a narrow band filter and activity detector sensing traffic before the signal is processed through any active gain stages.

Low pass filter 108 provides at its output analog voice orderwire plus DC. Orderwire extractor 121 is coupled to the output of filter 108 and extracts the analog voice orderwire for coupling to amplifiers 7 (FIG. 4). The output of extractor 121 is coupled to a low pass filter 122 to provide the DC for coupling to power supply 16.

J. Cable Modulator and Orderwire Insertion Module (FIG. 13)

The transistor transistor logic level full baud supergroup data and the 4.9152 MHz supergroup timing signals are coupled to pulse shaper 123 to convert the supergroup data to half baud data. A divide-by-two flip flop 124 in combination with routing gates 125 converts the isochronous half baud data into an alternating (A or 8) output. The resistive matching network 126 matches the transistor transistor logic gates of routing gates 125 to the output coupling transformer 127. Transformer 127 has its input windings phased so that logic zeros (ground) on lines A or B result in alternating positive and negative output pulses. The output pulses from transformer 127 are processed through build-out network and peak limiter 128 to normalize the total transmission path to the cable demodulator.

An auxiliary winding of transformer 127 supplies signal to a voltage doubler-detecor forming the activity detector 129 which will provide a cable traffic alarm, if the activity desired is not present, for coupling to module 10 (FIG. 4). Analog voice orderwire is added to the half-baud bipolar signal at the output of limiter 128 through means of the orderwire coupling transformer 130. The DC voltage from power supply 116

(where required in cable repeaters) is also added to the digital supergroup and analog voice orderwire at the output of limiter 128 by means of low pass filter 131 and transformer 130.

Module 17 (FIG. 4) having the block diagram illustrated in FIG. 12, is protected against surge on the cable by surge protector 132, while module 6 (FIG. 4) having the block diagram illustrated in FIG. 13 is protected against surge by surge protector 133.

K. Group Frame Recovery and Alarm Module

The group frame recovery and alarm module 9 of FIG. 4 is fully disclosed in a copending application of R. H. Haussmann and M. A. Epstein, Ser. No. 205,093, filed Dec. 16, 1971 having the same assignee as the present application. The disclosure of this copending application is incorporated in the present application by reference.

The following comments will be directed to the operation of module 9 and is a summary of the disclosure contained in the above cited copending application of R. H. Haussmann and M. A. Epstein.

In accordance with the present invention, it is required to monitor the PCM group input and output signals to detect the presence of either normal PCM synchronization pattern or the dummy pattern. If neither one is detected for any group signal, an alarm is activated for that group. In addition, it is required to sense the presence of the dummy signal in any one of the received groups and activate visual indicator 24.

Up to 16 group signals (8 input and 8 output) must be monitored. Using separate monitors requires 16 circuits, each capable of recognizing either of the two acceptable patterns, normal sync and dummy pattern, or 32 circuits each looking for one particular pattern. The quantities involved indicate that a sequential time-shared monitoring system should be employed.

A time shared frame monitoring system has different requirements than one which must monitor one signal continuously. A continuous monitoring system need not have a stringent frame acquisition time requirement, but is is important that its mean time between false loss of frame occurrences be quite long.

The time shared system of module 9 must have a very rapid mean acquisition time. This is necessary to keep the average time between successive "looks" at a given group signal short enough to prevent the propagation of a faulty signal down the line for a duration long enough to activate the alarms of successive multiplexers and demultiplexers. Of course, a time-shared cyclic monitoring system will alow a faulty signal to propagage for some finite length of time, but this can be kept to less than a built-in delay of the alarms in the succeeding multiplexers and demultiplexers.

Another more important requirement is that the frame acquisition time be long enough to assure a high probability of acquiring synchronism when there is a good signal present. This is necessary to keep the probability of a "false alarm" low enough to satisfy the performance specifications of the multiplexer and demultiplexer. A false alarm will, of course, cause substitution of a dummy pattern for a good PCM group signal, thereby interrupting the group traffic. This type of temporary traffic interruption will be considered a failure of group bit count integrity. The probability of a false alarm occurrence, together with the probabilities of other occurrences which affect the group bit count integrity, must result in mean time between group count integrity failures which satisfies the performance specification of the multiplexer and demultiplexer.

A simple frame sync recovery logic looking for the normal PCM group frame pattern would have an average search time of 9 milliseconds plus 2 milliseconds verify time. The addition of a simple look-ahead type frame synchronization, as disclosed in U.S. Pat. No. 3,594,502, can reduce this to three milliseconds acquisition plus 2 milliseconds verify time, or a total of 5 milliseconds. With no bit errors, the maximum search time is simply double the average search time. Including a random bit error distribution of one in a thousand makes the maximum search time approach infinitive if an infinite number of trails are considered. This means that a maximum frame search time cannot be picked which will guanrantee no false alarms. Also, a fixed frame search time cannot be picked that will take advantage of a short average frame search time and give a low enough probability of producing a false alarm.

Therefore, module 9 of FIG. 4 incorporates a framing circuit arrangement which uses a variable length cycle time which will be terminated by the occurrence of either the verification of normal or dummy pattern, or the end of a cycle time calculated to guarantee a low enough probability of false alarms to satisfy equipment operating specifications. For example, if a system is implemented by a counter to keep track of frame bit matches having a threshold of four (that is, after four successive matches it reuqires more than one bit error, or mismatch to produce a new search), and it is desired to guarantee a false alarm rate on a per group basis of less than one in 100 days or less than one in 200 days for each transmit and receive end, it has been found that a maximum search time of about 32 ms is required. It can be shown that for the $10^{-3}$ bit error rate the average search time is increased an insignificant amount. With a 32 ms limit per search, the maximum time between searches for one group is 0.512 seconds.

The advantage of the variable length search time is that the maximum length can be increased to provide a lower probability of false alarm occurrences while the average cycle time remains constant.

Another consideration is whether to use one search logic which can recognize either of two patterns, normal group sync or dummy pattern, or to use two individual search circuits and logically OR the results. The single circuit approach must allow for the fact that two different patterns will agree part of the time and when they disagree that information is useless. Therefore, the available information for recognizing frame sync is effectively less for each pattern than when they are inspected independently, and the average search time will become longer (typically twice as long). Also, since the presence of the dummy pattern must be noted while monitoring the receive groups, additional logic must be added and the savings realized with a single circuit do not justify this approach.

Using two separate search circuits has three significant advantages. (1) A three-bit dummy pattern (e.g. 110110 . . . ) has a three-bit frame length with resultant fast acquisition (approximately 0.1 ms average) rather than the 144 bit frame length (alternate ones and zeroes every 72 bits). (2) No "look ahead" technique is required for faster dummy search logic, therefore, the two circuits do not double the required logic. (3) The recognized pattern is immediately known with no further decoding required.

A 16-stage counter in module 9 will select the PCM group signal which is to be monitored. The counter outputs will be decoded by gates on the group modules. Taking the eight input groups and then the eight output group in succession simplifies the decoding. In addition, when the superframe receive module 20 has a supergroup frame alarm condition the last bit of the modulo 16 counter can be inhibited and the group frame logic will look only at the eight transmit groups. During this time the dummy pattern will be substituted for all eight receive groups. During 48-channel operation the third bit of the counter will be inhibited so only the first four transmit and receive groups will be monitored.

The counter decoding on the group modules 3 and 21 will switch the selected group data signal onto the wired AND bus input to mdoule 9 and will also enable the inputs to the flip flop which stores the alarm condition between searches. It also controls the substitution of dummy pattern and activates the alarm drivers.

The point at which each group signal is monitored requires some consideration. It is desirable, of course, to monitor the signals at the interface with external connections, but this is not realizable or practical for the following reasons: (1) The receive group monitoring point must be before the switch where dummy substitution is made. If it were after this switch, the monitor would be alternating between PCM group and dummy pattern with each cycle with an alternating alarm/no alarm condition. (2) The transmit group monitoring could be done right at the received signal, but this would require analog switching since the received signal is not at equipment logic levels. It is more practical to switch the signal after the input interface circuit.

Data only is switched into module 9. Therefore, a clock recovery circuit similar to that used by transmit group module 3 is required. The simple digital clock recovery system is acceptable since the frame recovery logic is not affected by timing jitter. The clock recovery circuit eliminates the requirement for 16 clock switches on group modules 3 and 21, and also eliminates false sensing of the transmit group signals due to malfunction of their clock recovery circuits.

While we have described above the principles of our invention in connection with specific apparatus it is to be more clearly understood that this description is made only by way of example and not as a limitation to the scope of our invention as set forth in the objects thereof and in the accompanying claims.

We claim: the

1. An asynchronous pulse code modulation multiplexer and demultiplexer combination to multiplex n asynchronous data groups having a first bit rate into a synchronous data stream having a predetermined fixed data format and a second bit rate greater than said first bit rate and to demultiplex said data groups from said data stream, where n is greater than one, comprising:

*n* inputs, each of said inputs being provided for a different one of said data groups;

*n* first means, each of said first means being coupled to a different one of said inputs, certain ones of said first means generating a stuff request signal upon achieving a predetermined phase difference between said first and second bit rates;

second means coupled in common to each of said first means, said second means responding to said stuff request signal from each of said first means to produce a stuff control signal for each of said certain ones of said first means and to multiplex unstuffed and stuffed data groups received from said first means according to said data format;

each of said certain ones of said first means responding to an associated one of said stuff control signals to produce only a single stuff bit for each of said stuff request signal for addition to the associated one of said certain ones of said data groups at a given bit position within said data format to produce stuffed data groups for multiplexing with unstuffed data groups by said second means to provide said synchronous data stream;

third means coupled to said second means to transmit said data stream along a given propagation medium;

fourth means coupled to said propagation medium to receive said data stream;

fifth means coupled to said fourth means, said fifth means being synchronized to said data stream to produce a destuff control signal upon occurrence of each of said stuff bits; and

*n* sixth means coupled to said fifth means, each of said sixth means responding to an associated one of said destuff control signals to delete said stuff bit from said certain ones of said data groups, each of said sixth means providing an associated one of said data groups at the output thereof.

2. A combination according to claim 1, wherein each of said first means includes an elastic store having seventh means coupled to an associated one of said n inputs responsive to an associated one of said data groups and to a first reference signal having a third bit rate less than said first bit rate to generate a write clock having said third bit rate, eighth means coupled to said second means responsive to a second reference signal having said second bit rate to generate a read clock having said second bit rate, a storage means coupled to said associated one of said n inputs, said seventh means and said eighth means responsive to said write clock to load said storage means with bits of said associated one of said data groups and to said read clock to unload said storage means, and a phase comparator coupled to said seventh means and said eighth means to produce said stuff request signal during the time position of said data format allocated to said associated one of said data group when there is a predetermined phase difference between said write and read clocks, said eighth means responding to said stuff control signal to inhibit said read clock one bit period resulting in the last bit of said associated one of said data group being read out of said storage means twice to provide said single stuff bit and thus a stuffed data group for coupling to said second means for multiplexing into said data stream.

3. A combination according to claim 2, wherein said seventh means includes a positive transition generator coupled to said associated one of said n inputs responsive to said associated one of said data groups to provide a first given output signal, a binary divide-by-two means coupled to the output of said generator to divide said first given output signal by two, an EXCLUSIVE-OR gate coupled to the output of said divide-by-two means responsive to said first given output signal divided by two and said first reference to provide a second given output signal, and a binary divide-by-eight means coupled to the output of said gate and an input of said generator providing a third given output signal which is a multiple of said write clock.

4. A combination according to claim 1, wherein each of said sixth means includes an elastic store having a storage means coupled to said fith means, seventh means coupled to said fifth means and said storage means responsive to a first reference signal having said second bit rate to generate a write clock to control the loading of said storage means with an associated one of said stuffed data groups demultiplexed from said data stream, and eighth means coupled to said seventh means and said storage means responsive to a second reference signal having a third bit rate less than said first bit rate to generate a read clock to unload said storage means to provide said associated one of said data groups as the demultiplexed output of an associated one of said sixth means, said seventh means being responsive to said destuff control signal to inhibit said write clock to prevent said stuff bit from being loaded into said storage means and thereby deleting said stuff bit from said associated one of said stuffed data groups.

5. A combination according to claim 4, wherein said eighth means includes a phase locked loop having a phase comparator responsive to said write and read clocks to produce a phase control signal, a low pass filter coupled to said phase comparator to pass said phase control signal therethrough, a voltage controlled oscillator coupled to said filter responsive to said phase control signal to adjust the frequency of the output signal of said oscillator, a frequency adder coupled to said oscillator to add the frequencies of said output signal of said oscillator and said second reference signal, and a binary divider coupled to the output of said adder to provide said read clock.

6. A combination according to claim 1, wherein each of said first means includes a first elastic store having seventh means coupled to an associated one of said n inputs responsive to an associated one of said data groups and to a first reference signal having a third bit rate less than said first bit rate to generate a write clock having said third bit rate, eighth means coupled to said second means responsive to a second reference signal having said second bit rate to generate a read clock having said second bit rate, a first storage means coupled to said associated one of said n inputs, said seventh means and said eighth means responsive to said write clock to load said first storage means with bits of said associated one of said data groups and to said read clock to unload said first storage means, and a phase comparator coupled to said seventh means and said eighth means to produce said stuff request signal during the time position of said data format allocated to said associated one of said data group when there is a predetermined phase difference between said write and read clocks, said eighth means responding to said stuff control signal to inhibit said read clock one bit period resulting in the last bit of said associated one of said data group being read out of said first storage means twice to provide said single stuff bit and thus a stuffed data group for coupling to said second means for multiplexing into said data stream; and each of said sixth means includes a second elastic store having a second storage means coupled to said fifth means, ninth means coupled to said fifth means and said second storage means responsive to a first reference signal having said second bit rate to generate a write clock to control the loading of said second storage means with an associated one of said stuffed data groups demultiplexed from said data stream, and tenth means coupled to said ninth means and said second storage means responsive to a second reference signal having a third bit rate less than said first bit rate to generate a read clock to unload said second storage means to provide said associated one of said data groups as the demultiplexed output of an associated one of said sixth means, said ninth means being responsive to said destuff control signal to inhibit said write clock to prevent said stuff bit from being loaded into said second storage means and thereby deleting said stuff bit from said associated one of said stuffed data groups.

7. A combination according to claim 6, wherein said tenth means includes a phase locked loop having a phase comparator responsive to said write and read clocks to produce a phase control signal, a low pass filter coupled to said phase comparator to pass said phase control signal therethrough, a voltage controlled oscillator coupled to said filter responsive to said phase control signal to adjust the frequency of the output signal of said oscillator, a frequency adder coupled to said oscillator to add the frequencies of said output signal of said oscillator and said second reference signal, and a binary divider coupled to the output of said adder to provide said read clock.

8. A combination according to claim 6, wherein said seventh means includes a positive transition generator coupled to said associated one of said n inputs responsive to said associated one of said data groups to provide a first given output signal, a binary divide-by-two means coupled to the output of said generator to divide said first given output signal by two, an EXCLUSIVE-OR gate coupled to the output of said divide-by-two means responsive to said first given output signal divided by two and said first reference to provide a second given output signal, and a binary divide-by-eight means coupled to the output of said gate and an input of said generator providing a third given output signal which is a multiple of said write clock.

9. A combination according to claim 1, wherein said data format includes 64 midframes within a single superframe, and 15 subframes within each of said midframes, the odd numbered ones of said subframes in each of said midframes including nine bits and the even numbered one of said subframes in each of said midframes including eight bits, the first eight bits of each of said subframes in each of said midframes conveying data groups and the ninth bit of said odd numbered ones of said subframes in each of said midframes being employed as bits of an overhead channel, said overhead channel in each of said midframes including three digital voice orderwire bits, one control and signalling bit, two short sync bits to define a short sync code, one digital data bit and one long sync bit providing one bit of a long sync code; and said second means includes a first source of reference signal having said second bit rates, a first binary divider and decoding logic means coupled to said first source to produce a fast group select code, subframe timing signals and overhead channel timing signals to define said subframes and the bits of said overhead channel, a second binary divider and decoding logic means coupled in series with said first divider and logic means to produce midframe timing signals to define said midframes and to produce said short sync code, a third binary divider and decoding logic means coupled in series with said second divider and logic means to produce a slow group select code, superframe timing signals to define said superframe and to produce a pseudo-random long sync code, a stuff control circuit coupled to each of said first means and said first, second and third divider and logic means responsive to said subframe timing signals, said fast group select code, said midframe timing signals, said slow group select code, said superframe timing signals and said stuff request signals to produce said stuff control signal and a control code for each of said stuff request signals conveyed by one bit of said overhead channel in a plurality of said midframes, a first multiplexer coupled to said third divider and logic means and said stuff control circuit to multiplex said control codes, digital data orderwire signalling, and digital voice orderwire signalling to form a control channel, a second multiplexer coupled to said second and third divider and logic means and said first multiplexer to multiplex said control channel, digital data orderwire signal, digital voice orderwire signal and said control channel to form said overhead channel, and a third multiplexer coupled to each of said first means, said source, said first divider and logic means and said second multiplexer to multiplex said overhead channel and said stuffed and unstuffed data groups to form said data stream.

10. A combination according to claim 9, wherein said stuff control circuit includes a second source of sampling timing signals, a third source of halt timing signals, a code comparator coupled to said first divider and logic means and said third divider and logic means responsive to said fast group select code and said slow group select code to produce a combined timing signal, a first AND gate coupled to said second source and said comparator to produce in response to said sampling timing signals and said combined timing signal a sampling pulse, a sampling flip flop coupled in common to each of said first means and said first AND gate responsive to said stuff request signals and said sampling pulse to produce said control code for each of said stuff request signals, and a second AND gate coupled to said third source and said sampling flip flop responsive to each of said control codes and said halt timing to produce said stuff control signals for each of said stuff request signals.

11. A combination according to claim 1, wherein said data format includes 64 midframes within a single superframe, and 15 subframes within each of said midframes, the odd numbered ones of said subframes in each of said midframes including nine bits and the even numbered ones of said subframes in each of said midframes including eight bits, the first eight bits of each of said subframes in each of said midframes conveying data groups and the ninth bit of said odd numbered ones of said subframes in each of said midframes being employed as bits of an overhead channel, said overhead channel in each of said midframes including three digital voice orderwire bits, one control and signalling bit, two short sync bits to define a short sync code, one digital data bit and one long sync bit providing one bit of a long sync code; and said fifth means includes clock recovery means coupled to said fourth means responsive to said received data stream to produce a clock having said second bit rate, a supergroup frame sync means coupled to said clock recovery means and said fourth means responsive to said clock, said short sync code and said long sync code to produce an inhibit signal when an out-of-sync condition is detected, first third coupled to said clock recovery means and said frame sync means responsive to said inhibit signal to inhibit a given number of bits of said clock to cooperate in establishing a frame sync condition, a first binary divider and decoding logic means coupled to said first inhibit logic to produce a fast group select code, subframe timing signals and overhead timing signals to define said subframes and the bits of said overhead channel, a second binary divider and decoding logic means coupled to said frame sync means to produce midframe timing signals to define said midframes and to produce said short sync code used as a reference short sync code by said frame sync means, second inhibit logic coupled in series between said first and second divider and logic means responsive to said inhibit signal to inhibit a given number of bits of the timing signal applied to the input of said second divider and logic means by said first divider and logic means to cooperate in establishing a frame sync condition, a third binary divider and decoding logic means coupled in series with said second divider and logic means and to said frame sync means to produce a slow group select code, superframe timing signals to define said superframe and to produce a pseudo-random long sync code used as a reference long sync code by said frame sync means, a first demultiplexer coupled to said fourth means, each of said sixth means and said first divider and logic means to demultiplex said stuffed and unstuffed data group and said overhead channel from said received data stream, a second demultiplexer coupled to said second and third divider and logic means and said first demultiplexer to demultiplex said control channel, digital data orderwire signal, and digital voice orderwire signal from said overhead channel, a third demultiplexer coupled to said third divider and logic means and said second demultiplexer to demultiplex said control codes, digital data orderwire signalling and digital voice orderwire signalling from said control channel, and a destuff control circuit coupled to each of said sixth means and said first, second and third divider and logic means responsive to said control codes, said subframe timing signals, said fast group select code, said midframe timing signals, said slow group select code and said superframe timing signals to produce a destuff control signal for each of said stuff bits whose time position in said data format is indicated by said control codes.

12. A combination according to claim 1, wherein said data format includes 64 midframes within a single superframe, and 15 subframes within each of said midframes, the odd numbered ones of said subframes in each of said midframes including nine bits and the even numbered ones of said subframes in each of said midframes including eight bits, the first eight bits of each of said subframes in each of said midframes conveying data groups and the ninth bit of said odd numbered ones of said subframes in each of said midframes being employed as bits of an overhead channel, said overhead channel in each of said midframes including three digital voice orderwire bits, one control and signalling bit, two short sync bits to define a short sync code, one digital data bit and one long sync bit providing one bit of a long sync code;

said second means includes a first source of reference signal having said second bit rate, a first binary divider and decoding logic means coupled to said first source to produce a fast group select code, subframe timing signals and overhead channel timing signals to define said subframes and the bits of said overhead channel, a second binary divider and decoding logic means coupled in series with said first divider and logic means to produce midframe timing signals to define said midframes and to produce said short sync code, a third binary divider and decoding logic means coupled in series with said second divider and logic means to produce a slow group select code, superframe timing signals to define said superframe and to produce a pseudo-random long sync code, a stuff control circuit coupled to each of said first means and said first, second and third divider and logic means responsive to said subframe timing signals, said fast group select code, said midframe timing signals, said slow group select code, said superframe timing signals and said stuff request signals to produce a said stuff control signal and a control code for each of said stuff request signals conveyed by one bit of said overhead channel in a plurality of said midframes, a first multiplexer coupled to said third divider and logic means and said stuff control circuit to multiplex said control codes, digital data orderwire signalling, and digital voice orderwire signalling to form a control channel, a second multiplexer coupled to said second and third divider and logic means and said first multiplexer to multiplex said control channel, digital data orderwire signal, digital voice orderwire signal and said control channel to form said overhead channel, and a third multiplexer coupled to each of said first means, said source, said first divider and logic means and said second multiplexer to multiplex said overhead channel and said stuffed and unstuffed data group to form said data stream; and said fifth means includes clock recovery means coupled to said fourth means responsive to said received data stream to produce a clock having said second bit rate, a supergroup frame sync means coupled to said clock recovery means and said fourth means responsive to said clock, said short sync code and said long sync code to produce an inhibit signal when an out-of-sync condition is detected, first inhibit logic coupled to said clock recovery means and said frame sync means responsive to said inhibit signal to inhibit a given number of bits of said clock to cooperate in establishing a frame sync condition, a fourth binary divider and decoding logic means coupled to said first inhibit logic to produce a fast group select code, subframe timing signals and overhead timing signals to define said subframes and the bits of said overhead channel, a fifth binary divider and decoding logic means coupled to said frame sync means to produce midframe timing signals to define said midframes and to produce said short sync code used as a reference short sync code by said frame sync means, second inhibit logic coupled in series between said fourth and fifth divider and logic means responsive to said inhibit signal to inhibit a given number of bits of the timing signal applied to the input of said fifth divider and logic means by said fourth divider and logic means to cooperate in establishing a frame sync condition, a sixth binary divider and decoding logic means coupled in series with said fifth divider and logic means and to said frame sync means to produce a slow group select code, superframe timing signals to define said superframe and to produce a pseudo-random long sync code used as a reference long sync code by said frame sync means, a first demultiplexer coupled to said fourth means, each of said sixth means and said fourth divider and logic means to demultiplex said stuffed and unstuffed data group and said overhead channel from said received data stream, a second demultiplexer coupled to said fifth and sixth divider and logic means and said first demultiplexer to demultiplex said control channel, digital data orderwire signal, and digital voice orderwire signal from said overhead channel, a third demultiplexer coupled to said sixth divider and logic means and said second demultiplexer to demultiplex said control codes, digital data orderwire signalling and digital voice orderwire signalling from said control channel, and a destuff control circuit coupled to each of said sixth means and said fourth, fifth and sixth divider and logic means responsive to said control codes, said subframe timing signals, said fast group select code, said midframe timing signals, said slow group select code and said superframe timing signals to produce a destuff control signal for each of said stuff bits whose time position in said data format is indicated by said control codes.

13. A combination according to claim 12, wherein said stuff control circuit includes a second source of sampling timing signals, a third source of halt timing signals, a code comparator coupled to said first divider and logic means and said third divider and logic means responsive to said fast group select code and said slow group select code to produce a combined timing signal, a first AND gate coupled to said second source and said comparator to produce in response to said sampling timing signals and said combined timing signal a sampling pulse, a sampling flip flop coupled in common to each of said first means and said first AND gate responsive to said stuff request signals and said sampling pulse to produce said control code for each of said stuff request signals, and a second AND gate coupled to said third source and said sampling flip flop responsive to each of said control codes and said halt timing signal to produce said stuff control signals for each of said stuff request signals.

14. An asynchronous pulse code modulation multiplexer to multiplex n asynchronous data groups having a first bit rate into a synchronous data stream having a predetermined fixed data format and a second bit rate greater than said first bit rate where n is an integer greater than one, comprising:

*n* inputs, each of said inputs being provided for a different one of said data groups;

*n* first means, each of said first means being coupled to a different one of said inputs, certain ones of said first means generating a stuff request signal upon achieving a predetermined phase difference between said first and second bit rates; and second means coupled in common to each of said first means, said second means responding to said stuff request signal from each of said certain ones of said first means to produce a stuff control signal for each of said certain ones of said first means and to multiplex unstuffed and stuffed data groups received from said first means according to said data format;

each of said certain ones of said first means responding to an associated one of said stuff control signals to produce only a single stuff bit for each of said stuff request signal for addition to the associated one of said certain ones of said data groups at a given bit position within said data format to produce stuffed data groups for multiplexing with unstuffed data groups by said second means to provide said synchronous data stream.

15. A multiplexer according to claim 14, wherein each of said first means includes an elastic store having seventh means coupled to an associated one of said n inputs responsive to an associated one of said data groups and to a first reference signal having a third bit rate less than said first bit rate to generate a write clock having said third bit rate, eighth means coupled to said second means responsive to a second reference signal having said second bit rate to generate a read clock having said second bit rate, a storage means coupled to said associated one of said n inputs, said seventh means and said eighth means responsive to said write clock to load said storage means with bits of said associated one of said data groups and to said read clock to unload said storage means, and a phase comparator coupled to said seventh means and said eighth means to produce said stuff request signal during the time position of said data format allocated to said associated one of said data group when there is a predetermined phase difference between said write and read clocks, said eighth means responding to said stuff control signal to inhibit said read clock one bit period resulting in the last bit of said associated one of said data group being read out of said storage means twice to provide said single stuff bit and thus a stuffed data group for coupling to said second means for multiplexing into said data stream.

16. A multiplexer according to claim 15, wherein said seventh means includes a positive transition generator coupled to said associated one of said n inputs responsive to said associated one of said data groups to provide a first given output signal, a binary divide-by-two means coupled to the output of said generator to divide said first given output signal by two, an EXCLUSIVE-OR gate coupled to the output of said divide-by-two means responsive to said first given output signal divided by two and said first reference to provide a second given output signal, and a binary divide-by-eight means coupled to the output of said gate and an input of said generator providing a third given output signal which is a multiple of said write clock.

17. A multiplexer according to claim 14, wherein said data format includes 64 midframes within a single superframe, and 15 subframes within each of said midframes, the odd numbered ones of said subframes in each of said midframes including nine bits and the even numbered ones of said subframes in each of said midframes including eight bits, the first eight bits of each of said subframes in each of said midframes conveying data groups and the ninth bit of said odd numbered ones of said subframes in each of said midframes being employed as bits of an overhead channel, said overhead channel in each of said midframes including three digital voice orderwire bits, one control and signalling bit, two short sync bits to define a short sync code, one digital data bit and one long sync bit providing one bit of a long sync code; and said second means includes a first source of reference signal having said second bit rate, a first binary divider and decoding logic means coupled to said first source to produce a fast group select code, subframe timing signals and overhead channel timing signals to define said subframes and the bits of said overhead channel, a second binary divider and decoding logic means coupled in series with said first divider and logic means to produce midframe timing signals to define said midframes and to produce said short sync code, a third binary divider and decoding logic means coupled in series with said second divider and logic means to produce a slow group select code, superframe timing signals to define said superframe and to produce a pseudo-random long sync code, a stuff control circuit coupled to each of said first means and said first, second and third divider and logic means responsive to said subframe timing signals, said fast group select code, said midframe timing signals, said slow group select code, said superframe timing signals and said stuff request signals to produce said stuff control signal and a control code for each of said stuff request signals conveyed by one bit of said overhead channel in a plurality of said midframes, a first multiplexer coupled to said third divider and logic means and said stuff control circuit to multiplex said control codes, digital data orderwire signalling, and digital voice orderwire signalling to form a control channel, a second multiplexer coupled to said second and third divider and logic means and said first multiplexer to multiplex said control channel, digital data orderwire signal, digital voice orderwire signal and said control channel to form said overhead channel, and a third multiplexer coupled to each of said first means, said source, said first divider and logic means and said second multiplexer to multiplex said overhead channel and said stuffed and unstuffed data groups to form said data stream.

18. A multiplexer according to claim 17, wherein said stuff control circuit includes a second source of sampling timing signals, a third source of halt timing signals, a code comparator coupled to said first divider and logic means and said third divider and logic means responsive to said fast group select code and said slow group select code to produce a combined timing signal, a first AND gate coupled to said second source and said comparator to produce in response to said sampling timing signals and said combined timing signal a sampling pulse, a sampling flip flop coupled in common to each of said first means and said first AND gate responsive to said stuff request signals and said sampling pulse to produce said control code for each of said stuff request signals, and a second AND gate coupled to said third source and said sampling flip flop responsive to each of said control codes and said halt timing signal to produce said stuff control signals for each of said stuff request signals.

19. An asynchronous pulse code modulation demultiplexer to demultiplex a synchronous data stream having a predetermined fixed data format and a first bit rate into n asynchronous data groups having a second bit rate less than said first bit rate, said data groups being made synchronous with said data stream by adding only one stuff bit to certain ones of said data groups at different/given bit positions within said data format, where n is an integer greater than one, comprising:

an input for said data stream;

first means coupled to said input, said first means being synchronized to said data stream to produce a destuff control signal upon occurrence of each of said stuff bits; and

*n* second means coupled to said first means, each of said second means responding to an associated one of said destuff control signal to delete said stuff bit from said certain ones of said data groups, each of said second means providing an associated one of said data groups at the output thereof.

20. A demultiplexer according to claim 19, wherein each of said second means includes an elastic store having a storage means coupled to said fifth means, seventh means coupled to said fifth means and said storage means responsive to a first reference signal having said second bit rate to generate a write clock to control the loading of said storage means with an associated one of said stuffed data groups demultiplexed from said data stream, and eighth means coupled to said seventh means and said storage means responsive to a second reference signal having a third bit rate less than said first bit rate to generate a read clock to unload said storage means to provide said associated one of said data groups as the demultiplexed output of an associated one of said sixth means, said seventh means being responsive to said destuff control signal to inhibit said write clock to prevent said stuff bit from being loaded into said storage means and thereby deleting said stuff bit from said associated one of said stuffed data groups.

21. A demuliplexer according to claim 20, wherein said eighth means includes a phase locked loop having a phase comparator responsive to said write and read clocks to produce a phase control signal, a low pass filter coupled to said phase comparator to pass said phase control signal therethrough, a voltage controlled oscillator coupled to said filter responsive to said phase control signal to adjust the frequency of the output signal of said oscillator, a frequency adder coupled to said oscillator to add the frequencies of said output signal of said oscillator and said second reference signal, and a binary divider coupled to the output of said adder to provide said read clock.

22. A demultiplexer according to claim 19, wherein said data format includes 64 midframes within a single superframe, and 15 subframes within each of said midframes, the odd numbered ones of said subframes in each of said midframes including nine bits and the even numbered ones of said subframes in each of said midframes including eight bits, the first eight bits of each of said subframes in each of said midframes conveying data groups and the ninth bit of said odd numbered ones of said subframes in each of said midframes being employed as bits of an overhead channel, said overhead channel in each of said midframes including three digital voice orderwire bits, one control and signalling bit, two short sync bits to define a short sync code, one digital data bit and one long sync bit providing one bit of a long sync code; and said first means includes clock recovery means coupled to said input responsive to said received data stream to produce a clock having said second bit rate, a supergroup frame sync means coupled to said clock recovery means and said input responsive to said clock, said short sync code and said long sync code to produce an inhibit signal when an out-of-sync condition is detected, first inhibit logic coupled to said clock recovery means and said frame sync means responsive to said inhibit signal to inhibit a given number of bits of said clock to cooperate in establishing a frame sync condition, a first binary divider and decoding logic means coupled to said first inhibit logic to produce a fast group select code, subframe timing signals and overhead timing signals to define said subframes and the bits of said overhead channel, a second binary divider and decoding logic means coupled to said frame sync means to produce midframe timing signals to define said midframes and to produce said short sync code used as a reference short sync code by said frame sync means, second inhibit logic coupled in series between said first and second divider and logic means responsive to said inhibit signal to inhibit a given number of bits of the timing signal applied to the input of said second divider and logic means by said first divider and logic means to cooperate in establishing a frame sync condition, a third binary divider and decoding logic means coupled in series with said second divider and logic means and to said frame sync means to produce a slow group select code, superframe timing signals to define said superframe and to produce a pseudorandom long sync code used as a reference long sync code by said frame sync means, a first demultiplexer coupled to said input, each of said sixth means and said first divider and logic means to demultiplex said stuffed and unstuffed data group and said overhead channel from said received data stream, a second demultiplexer coupled to said second and third divider and logic means and said first demultiplexer to demultiplex said control channel, digital data orderwire signal, and digital voice orderwire signal from said overhead channel, a third demultiplexer coupled to said third divider and logic means and said second demultiplexer to demultiplex said control codes, digital data orderwire signalling and digital voice orderwire signalling from said control channel, and a destuff control circuit coupled to each of said sixth means and said first, second and third divider and logic means responsive to said control codes, said subframe timing signals, said fast group select code, said midframe timing signals, said slow group select code and said superframe timing signals to produce a destuff control signal for each of said stuff bits whose time position in said data format is indicated by said control codes.

* * * * *